United States Patent
Shinbori et al.

(10) Patent No.: US 8,925,670 B2
(45) Date of Patent: Jan. 6, 2015

(54) VEHICLE

(71) Applicant: Yamaha Hatsudoki Kabushiki Kaisha, Iwata-shi, Shizuoka (JP)

(72) Inventors: Masahide Shinbori, Shizuoka (JP); Yasuhiro Suzuki, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 14/178,909

(22) Filed: Feb. 12, 2014

(65) Prior Publication Data

US 2014/0224563 A1     Aug. 14, 2014

Related U.S. Application Data

(60) Provisional application No. 61/764,690, filed on Feb. 14, 2013.

(51) Int. Cl.
*B60K 1/00* (2006.01)
*B60K 5/00* (2006.01)

(52) U.S. Cl.
CPC ........................................ *B60K 5/00* (2013.01)
USPC ........................................................ 180/291

(58) Field of Classification Search
USPC ............... 180/291; 296/10, 183.1, 184.1, 19, 296/65.03, 39.3, 64; 248/503.1
See application file for complete search history.

(56) References Cited

U.S. PATENT DOCUMENTS

| | | | | |
|---|---|---|---|---|
| 3,918,554 | A | * | 11/1975 | Bourgraf et al. ................ 188/32 |
| 4,305,602 | A | * | 12/1981 | Ungvari et al. ............ 280/460.1 |
| 4,637,081 | A | * | 1/1987 | Clark ................. 5/18.1 |
| 5,108,817 | A | * | 4/1992 | Kidd et al. .................... 428/192 |
| 5,509,710 | A | * | 4/1996 | Eavenson et al. ................ 296/19 |
| 8,157,039 | B2 | * | 4/2012 | Melvin et al. ................ 180/68.2 |
| 8,376,443 | B2 | * | 2/2013 | Kemp et al. ..................... 296/66 |
| 2009/0115222 | A1 | * | 5/2009 | Hohnl et al. ............... 296/183.1 |
| 2013/0062909 | A1 | * | 3/2013 | Harris et al. ............... 296/182.1 |

FOREIGN PATENT DOCUMENTS

| | | |
|---|---|---|
| JP | 2010-95105 A | 4/2010 |
| WO | 2010/044174 A1 | 4/2010 |

* cited by examiner

*Primary Examiner* — John Walters
*Assistant Examiner* — James Triggs
(74) *Attorney, Agent, or Firm* — Keating & Bennett, LLP

(57) ABSTRACT

A vehicle includes a pair of front wheels, at least a pair of rear wheels, a frame portion supported by the pair of front wheels and the pair of rear wheels, a roll-over protection cage supported by the frame portion, a cargo bed supported by the frame portion pivotably behind the roll-over protection cage, an engine supported by the frame portion below the cargo bed, an output adjuster disposed below the cargo bed to adjust an output of the engine, and a protective member disposed between the cargo bed and the output adjuster. The protective member overlaps at least a portion of the output adjuster but does not overlap at least a portion of the engine in a plan view.

9 Claims, 25 Drawing Sheets

VEHICLE

BACKGROUND OF THE INVENTION

1. Field of the Invention

The present invention relates to vehicles, and more specifically to a vehicle including a cargo bed.

2. Description of the Related Art

Conventionally, there is proposed a variety of off-road vehicles (e.g., Recreational Off-Highway Vehicles (ROVs)). For example, WO2010/044174A1 discloses a vehicle, which includes a pair of front wheels, a pair of rear wheels, and a body supported by the pair of front wheels and the pair of rear wheels. At a rear portion of the body, there is provided an engine room as a sealed structure, in which an engine is installed. Above the engine room, a bed is provided. The bed is supported by the body pivotably in an up-down direction about an axis at a rear portion of the bed.

In such a vehicle as the above which is provided with a bed that is pivotable in an up-down direction, the bed is usually raised when performing maintenance operations to the engine and output adjusters (such as a throttle body) which are disposed around the engine. After the maintenance operations are over, the bed is lowered again to the original position but it happens sometimes that a tool or other object is left between the bed and the engine room and is pressed toward the engine room by the bed as the bed is lowered. Generally, output adjusters are damaged more easily than the engine by external forces and therefore, it is desirable to prevent tools or other objects from making contact with the output adjuster even in such an incident that a tool or other object was pressed toward the engine room as described above. The vehicle disclosed in WO2010/044174A1 has an engine room having a sealed structure, and therefore tools and other objects are prevented from making contact with the output adjuster even if they are pressed toward the engine room. Thus, it is possible to prevent damage to the output adjuster.

However, in the vehicle according to WO2010/044174A1, the engine room has a sealed structure as already described. Therefore, the engine room must be opened when performing engine maintenance operations. In this case, the vehicle requires a task of opening the engine room, and this decreases work efficiency.

SUMMARY OF THE INVENTION

Therefore, preferred embodiments of the present invention provide a vehicle which is capable of protecting an output adjuster and makes it easy to perform engine maintenance operations.

According to a preferred embodiment of the present invention, a vehicle includes a pair of front wheels; at least a pair of rear wheels; a frame portion supported by the pair of front wheels and the pair of rear wheels; a roll-over protection cage supported by the frame portion; a cargo bed supported by the frame portion pivotably behind the roll-over protection cage; an engine supported by the frame portion below the cargo bed; an output adjuster disposed below the cargo bed to adjust an output of the engine; and a protective member disposed between the cargo bed and the output adjuster. With the above arrangement, the protective member overlaps at least a portion of the output adjuster but does not overlap at least a portion of the engine in a plan view.

According to a preferred embodiment of the present invention, the protective member overlaps at least a portion of the output adjuster in a plan view. Thus, even if a tool or object is left or lodged between the output adjuster and the cargo bed after maintenance operations have been finished, contact between the tool or other object and the output adjuster can be reduced by the protective member when the cargo bed is lowered. Specifically, it is possible to protect the output adjuster, with the protective member. On the other hand, the protective member does not overlap at least a portion of the engine in a plan view. In other words, at least a portion of the engine is exposed from the protective member in a plan view. This allows maintenance operations of the engine to be made easily from above the engine.

Preferably, the cargo bed includes a bottom portion, and a reinforcing portion extending in a width direction of the vehicle on a lower surface of the bottom portion. Further, the reinforcing portion includes a mounting portion attached to the bottom portion, and a protruding portion protruding downward from the mounting portion. With this arrangement, the protruding portion does not overlap either of the output adjuster and the protective member in a plan view. In this case, the protruding portion does not overlap the output adjuster in a plan view. In other words, the protruding portion and the output adjuster are not disposed at the same position in a fore-aft direction. In this case, even if the reinforcing portion is provided in the lower surface of the bottom portion of the cargo bed, a decrease in the distance between the cargo bed and the output adjuster in an up-down direction is significantly reduced or prevented. Likewise, the protruding portion does not overlap the protective member in a plan view. In other words, the protruding portion and the protective member are not disposed at the same position in a fore-aft direction. In this case, even if the reinforcing portion is provided in the lower surface of the bottom portion of the cargo bed, a decrease in the distance between the cargo bed and the protective member in an up-down direction is significantly reduced or prevented. As a result, even if the reinforcing portion is provided in the lower surface of the bottom portion of the cargo bed, it is possible to make a predetermined clearance between the cargo bed and the output adjuster, and between the cargo bed and the protective member as well, without increasing the height of the cargo bed (more specifically, the bottom portion) from the ground surface.

Further preferably, the engine includes a cylinder head, and the protective member does not overlap at least a portion of the cylinder head in a plan view. In this case, engine maintenance operations can be made more easily since at least a portion of the cylinder head is exposed from the protective member in a plan view.

Further, preferably, the protective member is supported by the frame portion. In this case, even if the protective member comes under a load from a tool or other object, the load can be born by the frame portion. In other words, the arrangement reduces transmission of the load received by the protective member to the output adjuster. As a result, the output adjuster is sufficiently protected.

Preferably, the frame portion includes a pair of side frame portions extending in a fore-aft direction below the cargo bed, and the protective member connects the pair of side frame portions to each other. In this case, the arrangement sufficiently reduces transmission of the load received by the protective member to the output adjuster. Thus, the output adjuster is sufficiently protected. Also, the arrangement improves rigidity of the pair of side frame portions with the protective member.

Further preferably, the pair of side frame portions includes a pair of first supporting portions supporting a rear portion of the cargo bed pivotably, and a second supporting portion disposed at a more forward position than the pair of first supporting portions to support a forward portion of the cargo bed. By providing the first supporting portions and the second supporting portion in the side frame portions so as to support the cargo bed as described, it becomes possible to simplify the structure of the vehicle. Also, since the load of the cargo bed is received by the side frame portions, it is possible to sufficiently reduce the load of the cargo bed born by the protective member. This sufficiently reduces load transfer from the protective member to the output adjuster, so the output adjuster is sufficiently protected.

Further, preferably, the protective member is detachable from/attachable to the frame portion. In this case, by removing the protective member, performing maintenance operations to components surrounding the engine, including removal/reinstallation of the engine itself becomes easier.

Preferably, the frame portion includes a pair of side frame portions extending in a fore-aft direction below the cargo bed, and the protective member has its upper end at a higher position than the pair of side frame portions. In this case, the arrangement makes it possible to provide sufficient space around the protective member. Thus, even if a tool or other object is located near or around the protective member, it is possible to sufficiently reduce or prevent the possibility that the tool or other object is pressed onto the output adjuster by the cargo bed when the cargo bed is lowered back into the original position. Thus, the output adjuster is sufficiently protected.

Further preferably, the output adjuster includes a throttle body, and the protective member is disposed between the cargo bed and the throttle body. In this case, the throttle body is sufficiently protected.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
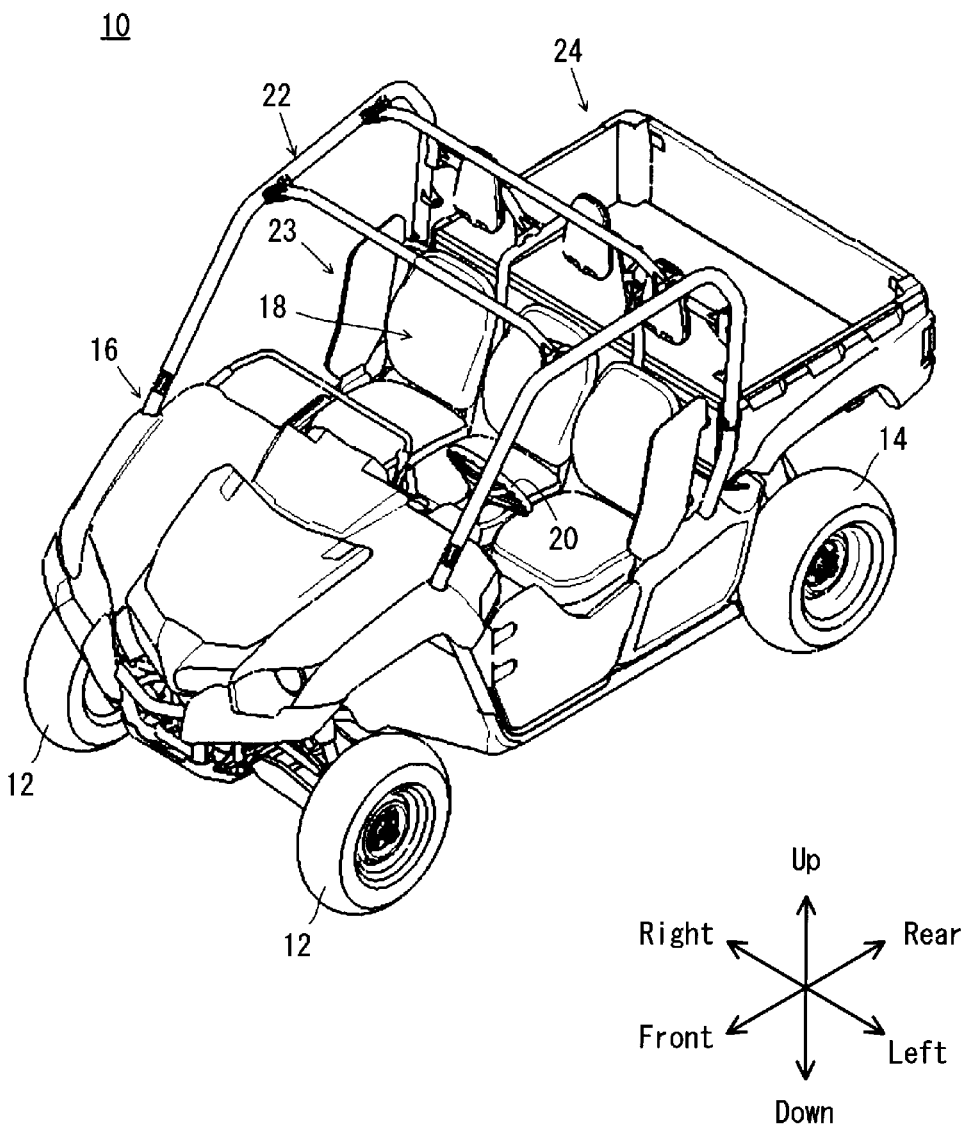
FIG. 1 is a perspective view of a vehicle according to a preferred embodiment of the present invention.

Hereinafter, preferred embodiments of the present invention will be described with reference to the drawings. It is noted that the terms front and rear, right and left, up and down as used to describe the preferred embodiments of the present invention are determined from the driver's position on a seat 18a of a vehicle 10, with the driver facing toward a steering wheel 20.

Referring to FIG. 1 through FIG. 5, the vehicle 10 according to a preferred embodiment of the present invention preferably is a four-wheel-drive recreational off-highway vehicle (ROV), and includes a pair of front wheels 12, a pair of rear wheels 14, a frame portion 16, a seat unit 18, a steering wheel 20, a roll-over protection cage 22, a shoulder bolster portion 23 and a cargo bed 24. The frame portion 16 is supported by the pair of front wheels 12 and the pair of rear wheels 14. Referring to FIG. 6, the frame portion 16 includes a main frame portion 16a supported by the pair of front wheels 12 (see FIG. 1) and the pair of rear wheels 14 (see FIG. 1); and a seat frame portion 16b supported by the main frame portion 16a. The seat unit 18 is supported by the seat frame portion 16b.

Figure 7:
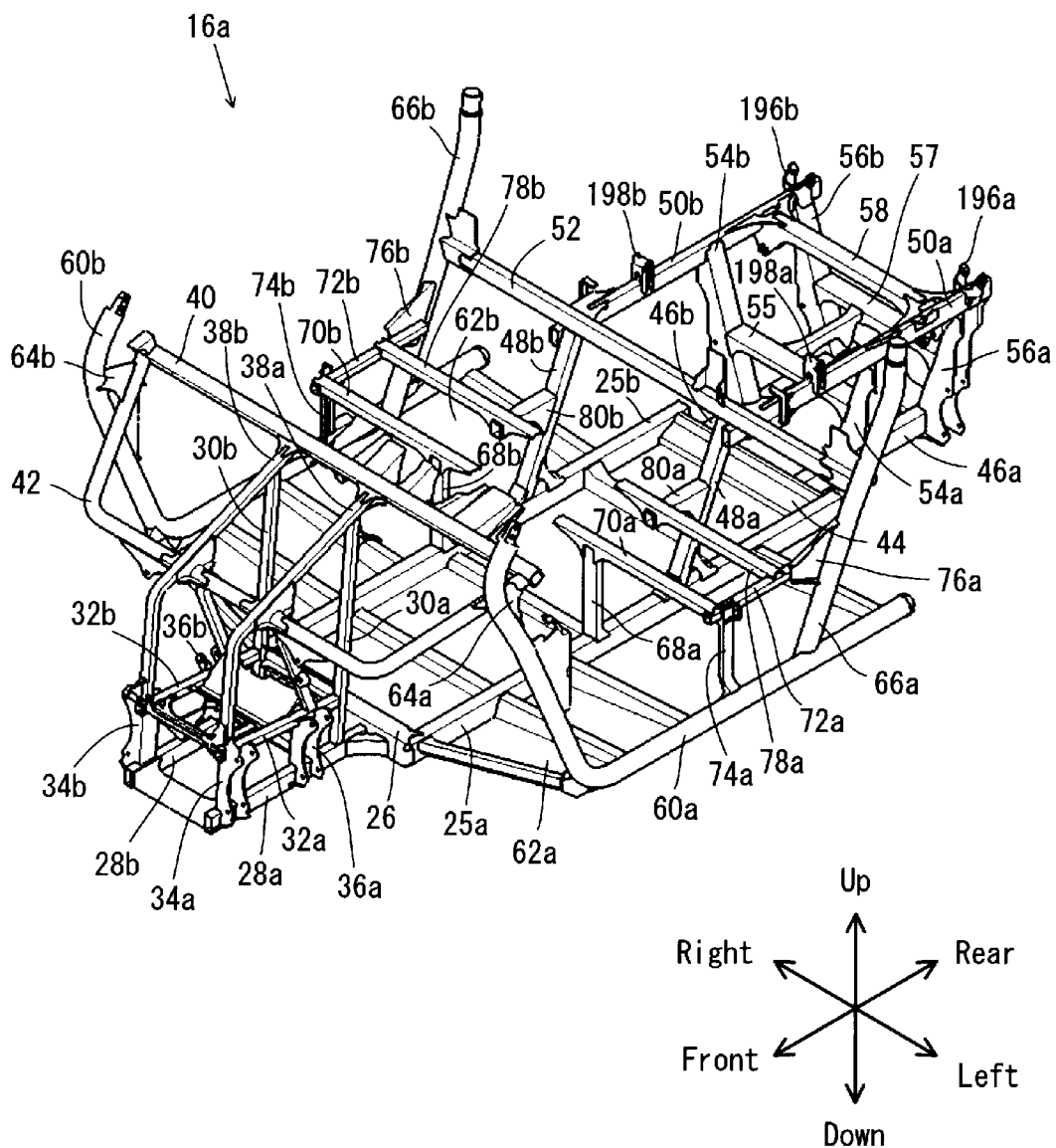
FIG. 7 is a perspective view of a main frame portion.

Referring to FIG. 7, the main frame portion 16a includes a pair of side frame portions 25a, 25b extending in a fore-aft direction. The side frame portion 25a and the side frame portion 25b are parallel or substantially parallel to each other. The side frame portion 25a and the side frame portion 25b have their respective forward ends connected to each other by a cross member 26 extending in a left-right direction (a width direction of the vehicle 10).

From the cross member 26, a pair of side frame portions 28a, 28b extend forward. In the width direction of the vehicle 10, the side frame portions 28a, 28b are on an inner side than the side frame portions 25a, 25b. The side frame portion 28a and the side frame portion 28b are parallel or substantially parallel to each other. A pair of support frame portions 30a, 30b extend upward from respective rearward regions of the side frame portions 28a, 28b.

Above the side frame portions 28a, 28b, a pair of side frame portions 32a, 32b extend forward from the support frame portions 30a, 30b. The side frame portion 32a and the side frame portion 32b are parallel or substantially parallel to each other.

The side frame portions 28a, 28b have their forward end regions connected to respective forward end regions of the side frame portions 32a, 32b by a pair of support frame portions 34a, 34b extending in an up-down direction. The side frame portions 28a, 28b have their rearward regions connected to respective rearward regions of the side frame portions 32a, 32b by a pair of support frame portions 36a, 36b extending in an up-down direction. The support frame portions 36a, 36b are at a more rearward position than the support frame portions 34a, 34b.

The side frame portions 32a, 32b have their forward end regions connected to a pair of support frame portions 38a, 38b. The support frame portions 38a, 38b extend upward from the side frame portions 32a, 32b, and then obliquely in a rearward and upward direction. The support frame portions 30a, 30b have their upper ends connected to respective rearward end regions of the support frame portions 38a, 38b. The support frame portions 38a, 38b have their rear ends connected to a cross member 40 extending in a left-right direction.

From the cross member 40, a U-shaped or substantially U-shaped frame portion 42 extends forward, below the support frame portions 38a, 38b. The U-shaped or substantially U-shaped frame portion 42 has two end regions connected to respective end regions of the cross member 40. The U-shaped or substantially U-shaped frame portion 42 has an intermediate portion connected to the support frame portions 38a, 38b.

The side frame portion 25a and the side frame portion 25b have their respective rearward end regions connected to each other by a cross member 44 extending in a left-right direction. From the cross member 44, a pair of side frame portions 46a, 46b extend rearward. In the width direction of the vehicle 10, the side frame portions 46a, 46b are on an inner side than the side frame portions 25a, 25b. The side frame portion 46a and the side frame portion 46b are parallel or substantially parallel to each other.

At a more forward position than the cross member 44, a pair of support frame portions 48a, 48b extend obliquely in an upward and rearward direction from the pair of side frame portions 25a, 25b. At a higher position than the side frame portions 46a, 46b, a pair of side frame portions 50a, 50b extend in a fore-aft direction. The side frame portion 50a and the side frame portion 50b are parallel or substantially parallel to each other. In the width direction of the vehicle 10, the side frame portions 50a, 50b are on an outer side than the side frame portions 46a, 46b. The side frame portions 50a, 50b have their forward end regions connected to respective upper end regions of the support frame portions 48a, 48b. The support frame portions 48a, 48b have their upper ends connected to a cross member 52 extending in a left-right direction.

Referring to FIG. 6 and FIG. 7, the side frame portions 46a, 46b and the side frame portions 50a, 50b are connected to each other by a pair of support frame portions 54a, 54b which extend in an up-down direction and a pair of support frame portions 56a, 56b which extend in an up-down direction. The support frame portions 54a, 54b are at a more forward position than the support frame portions 56a, 56b. The support frame portion 54a and the support frame portion 54b are connected to each other by a cross member 55 extending in a left-right direction. The support frame portion 56a and the support frame portion 56b are connected to each other by a cross member 57 extending in a left-right direction. The side frame portion 50a and the side frame portion 50b are connected to each other by a cross member 58 extending in a left-right direction. The cross member 58 is at a position which is more rearward than the support frame portions 54a, 54b and more forward than the support frame portions 56a, 56b.

In the width direction of the vehicle 10, there is provided a pair of L-shaped or substantially L-shaped support frame portions 60a, 60b on respective outer sides of the side frame portions 25a, 25b. The support frame portion 60a is connected to the side frame portion 25a via a plate frame portion 62a, whereas the support frame portion 60b is connected to the side frame portion 25b via a plate frame portion 62b.

Referring to FIG. 7, the support frame portions 60a, 60b have their upper regions connected to two end regions of the U-shaped or substantially U-shaped frame portion 42 via connecting members 64a, 64b. A pair of support frame portions 66a, 66b extend obliquely in an upward and rearward direction from rearward regions of the support frame portions 60a, 60b. The support frame portions 66a, 66b have their substantially intermediate regions connected to two end regions of the cross member 52.

A pair of support frame portions 68a, 68b extend upward from substantially intermediate regions of the side frame portions 25a, 25b. A pair of support frame portions 70a, 70b extend in a left-right direction, being supported by upper ends of the support frame portions 68a, 68b. The support frame portion 70a has an end region (left end region in the present preferred embodiment) connected to a forward end region of a support frame portion 72a which extends in a fore-aft direction, whereas the support frame portion 70b has an end region (right end region in the present preferred embodiment) connected to a forward end region of a support frame portion 72b which extends in a fore-aft direction.

The support frame portion 72a has a forward region connected to the support frame portion 60a by a support frame portion 74a which extends in an up-down direction, whereas the support frame portion 72b has a forward region connected to the support frame portion 60b by a support frame portion 74b which extends in an up-down direction. The support frame portion 72a has a rearward region connected to the support frame portion 66a via a connecting member 76a, whereas the support frame portion 72b has a rearward region connected to the support frame portion 66b via a connecting member 76b.

Behind the support frame portion 70a, a support frame portion 78a is parallel or substantially parallel to the support frame portion 70a, whereas behind the support frame portion 70b, a support frame portion 78b is parallel or substantially parallel to the support frame portion 70b. The support frame portion 78a has an end region (left end region in the present preferred embodiment) connected to the support frame portion 72a, whereas the support frame portion 78b has an end region (right end region in the present preferred embodiment) connected to the support frame portion 72b.

A pair of support frame portions 80a, 80b extend forward from substantially intermediate regions of the support frame portions 48a, 48b. The support frame portions 80a, 80b have their forward end regions connected to the support frame portions 78a, 78b.

Referring to FIG. 6 and FIG. 7, the seat unit 18 is supported by the support frame portions 70a, 70b, 78a, 78b of the main frame portion 16a via the seat frame portion 16b. The seat unit 18 includes seats 18a, 18b and 18c, and headrest portions 19a, 19b and 10c (see FIG. 3 through FIG. 5). Referring to FIG. 1, the steering wheel 20 is in front of the seat 18a of the seat unit 18. The roll-over protection cage 22 covers the seat unit 18 and the steering wheel 20. The roll-over protection cage 22 is supported by the frame portion 16.

Figure 8:
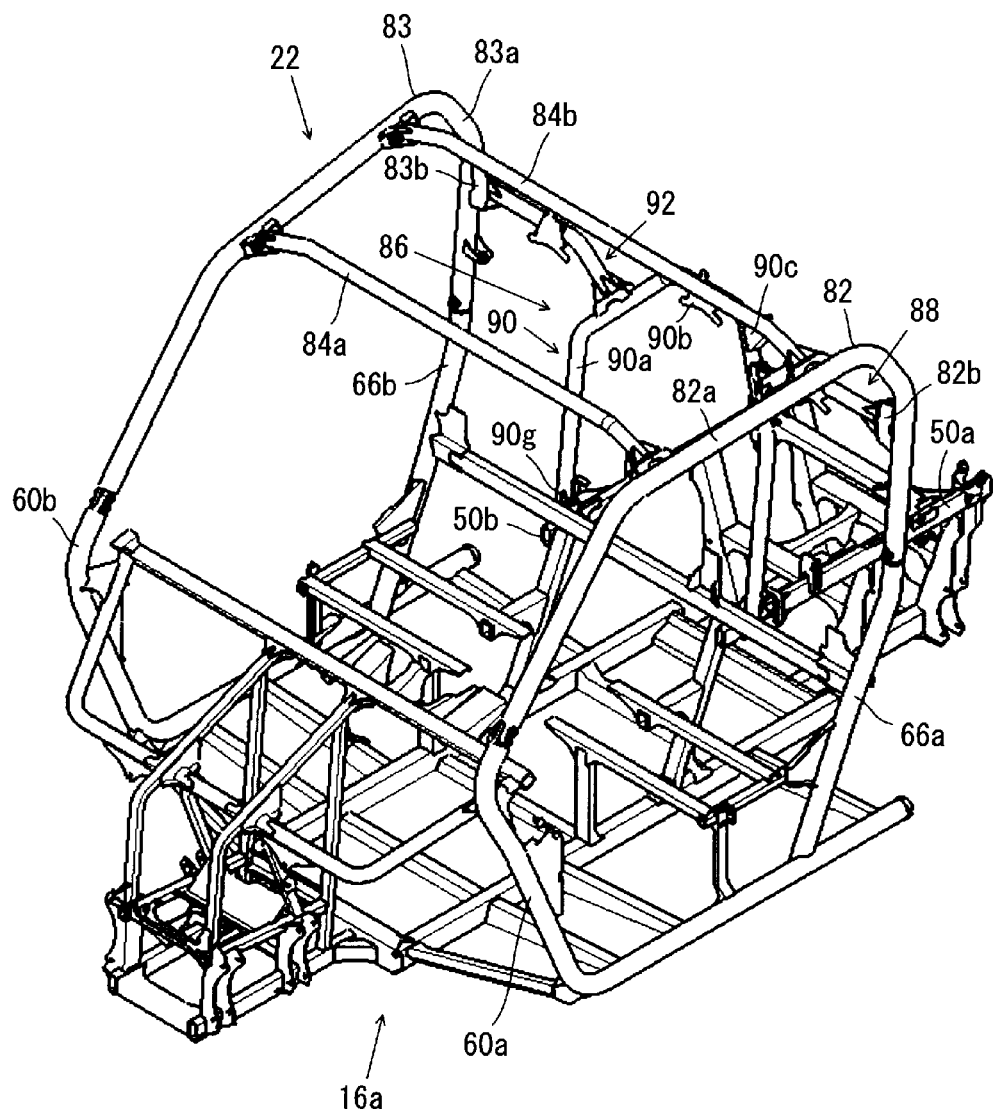
FIG. 8 is a perspective view of the main frame portion and the roll-over protection cage.

Referring to FIG. 8, the roll-over protection cage 22 includes a pair of side cage members 82, 83 extending in a fore-aft direction; a pair of roof members 84a, 84b extending in a left-right direction; and a cross member portion 86 extending in a left-right direction.

The side cage member 82 includes a main body portion 82a which has a shape of an inverted letter of U or a shape substantially of an inverted letter of U, in a side view; and a connecting portion 82b at a rearward region of the main body portion 82a. The connecting portion 82b protrudes inward (rightward in the present preferred embodiment) from the main body portion 82a in the width direction of the vehicle 10. The side cage member 83 includes a main body portion 83a which has a shape of an inverted letter of U or a shape substantially of an inverted letter of U, in a side view; and a connecting portion 83b at a rearward region of the main body portion 83a. The connecting portion 83b protrudes inward (leftward in the present preferred embodiment) from the main body portion 83a in the width direction of the vehicle 10.

The main body portions 82a, 83a are supported by the frame portion 16. More specifically, the main body portion 82a has an end region (forward end region in the present preferred embodiment), which is connected to an upper end region of the support frame portion 60a; and the main body portion 82a has another end region (rearward end region in the present preferred embodiment), which is connected to an upper end region of the support frame portion 66a. The main body portion 82a is fixed to the support frame portions 60a, 66a with, e.g., fasteners (such as bolts and nuts). Likewise, the main body portion 83a has an end region (forward end region in the present preferred embodiment), which is connected to an upper end region of the support frame portion 60b; and the main body portion 83a has another end region (rearward end region in the present preferred embodiment), which is connected to an upper end region of the support frame portion 66b. The main body portion 83a is fixed to the support frame portions 60b, 66b with, e.g., fasteners (such as bolts and nuts).

The roof members 84a, 84b connect an upper region of the side cage member 82 to an upper region of the side cage member 83. The roof member 84b is at a more rearward position than the roof member 84a. The roof member 84b is at a higher position than the seat unit 18.

Figure 3:
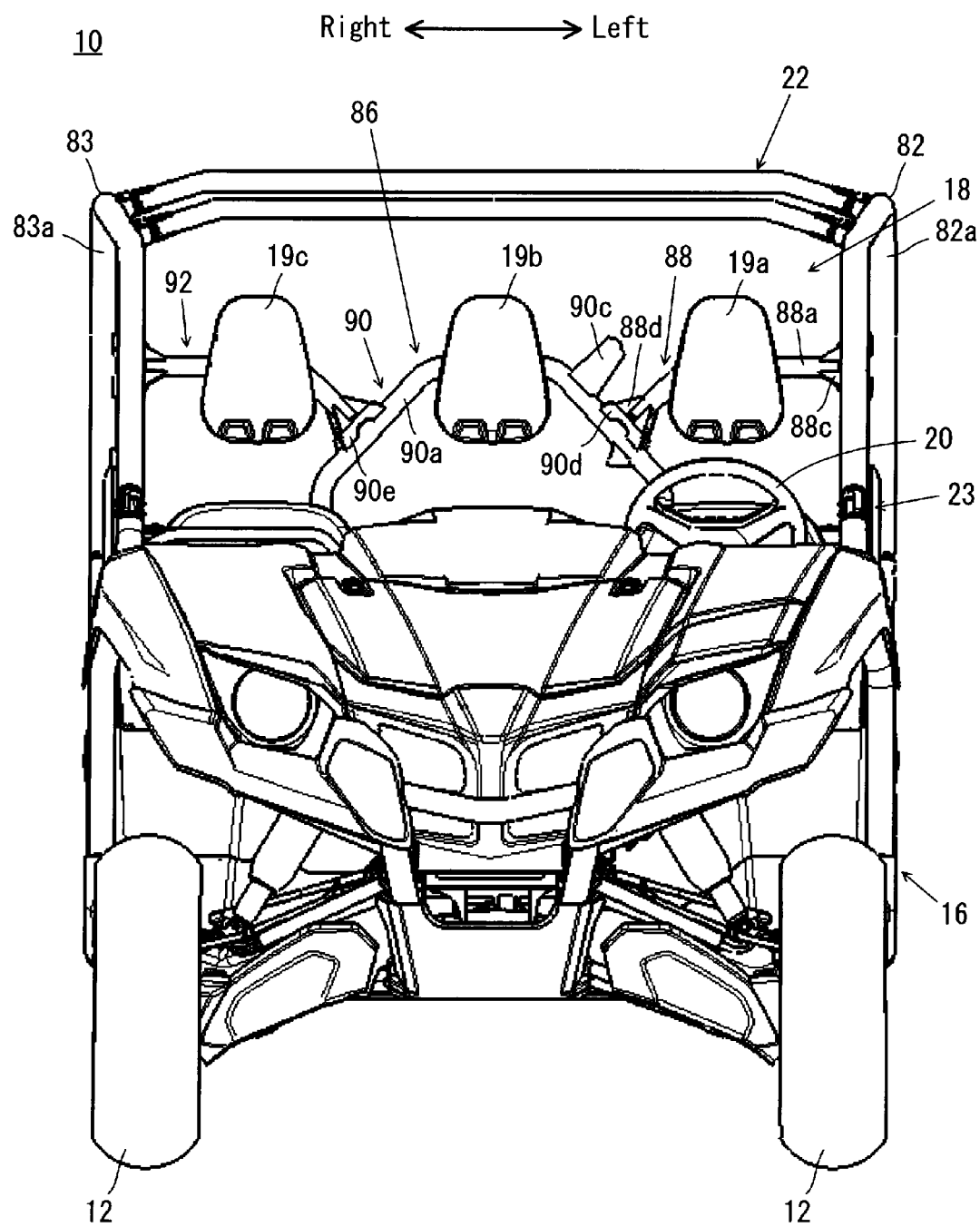
FIG. 3 is a front view of the vehicle.
Figure 4:
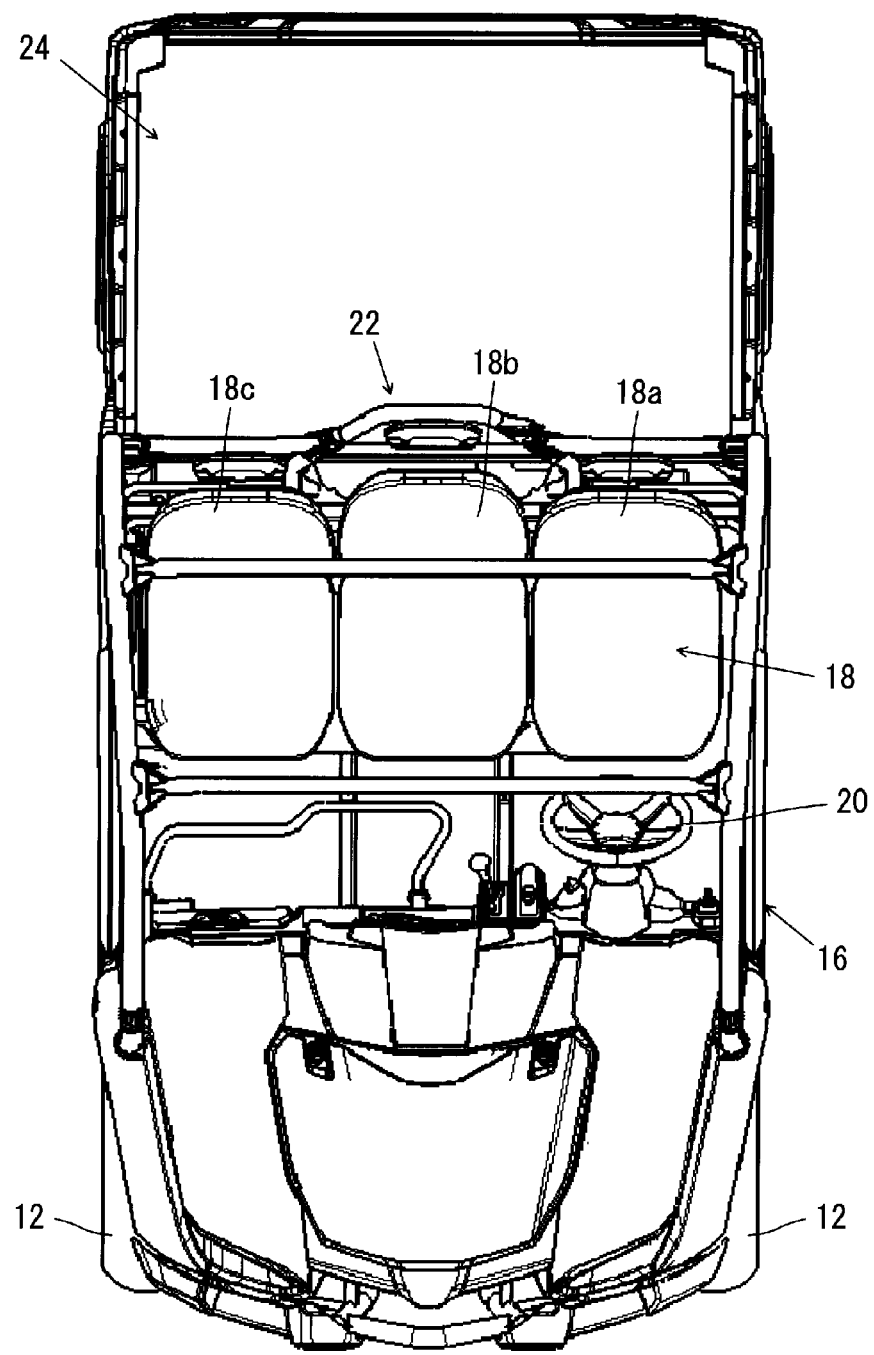
FIG. 4 is a plan view of the vehicle.
Figure 5:
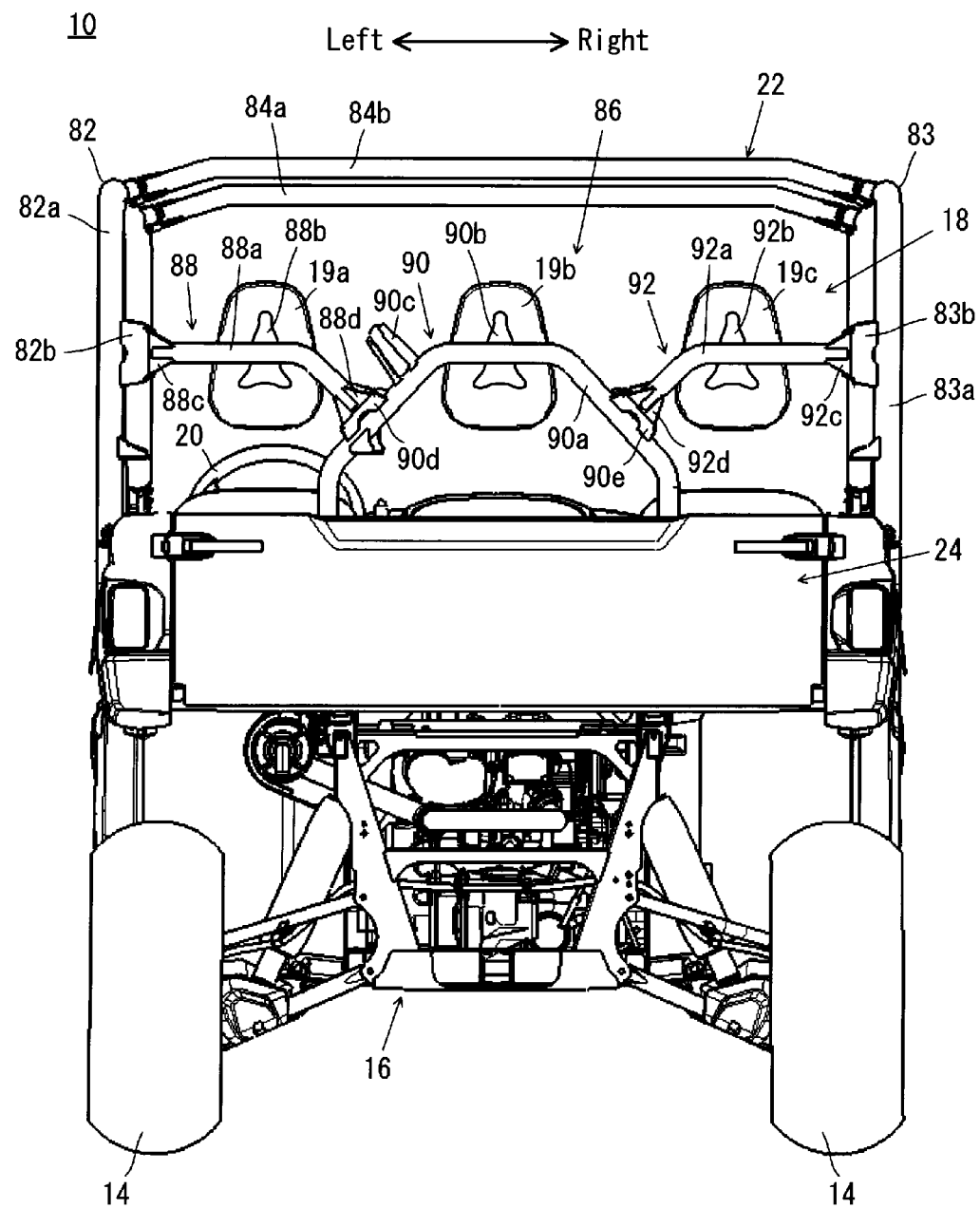
FIG. 5 is a rear view of the vehicle.
Figure 6:
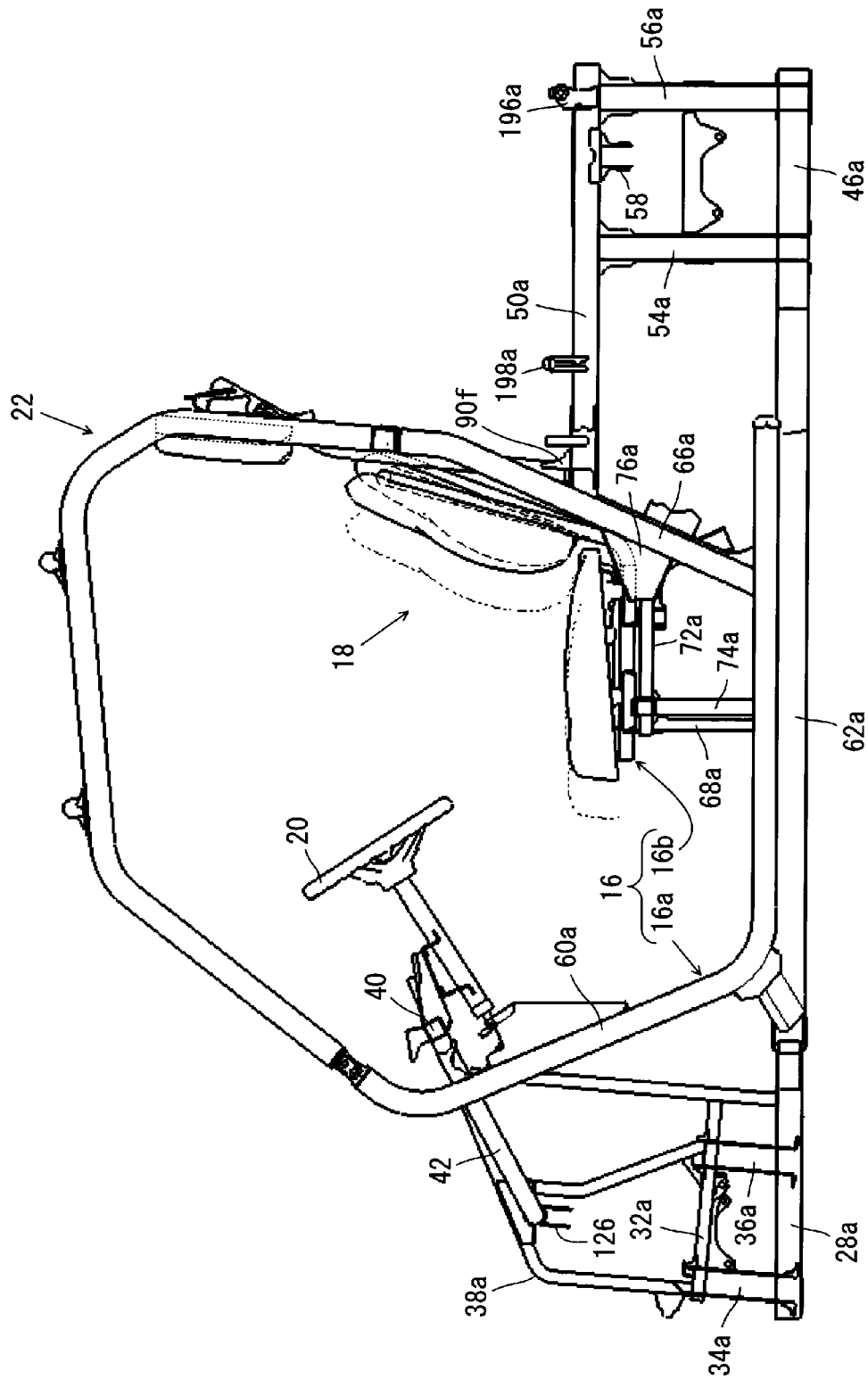
FIG. 6 is a side view showing a frame portion, a seat unit, a steering wheel and a roll-over protection cage.

Referring to FIG. 3, FIG. 5 and FIG. 8, the cross member portion 86 includes a support member 88, a support member 90 and a support member 92. The support member 90 is at an intermediate portion in the width direction of the vehicle 10, the support member 88 connects the support member 90 and the side cage member 82 to each other, and the support member 92 connects the support member 90 and the side cage member 83 to each other.

Referring to FIG. 5, the support member 88 includes a main body portion 88a extending in a left-right direction; a mounting portion 88b fixed to an intermediate region of the main body portion 88a; a connecting portion 88c fixed to an end region (left end region in the present preferred embodiment) of the main body portion 88a; and a connecting portion 88d fixed to another end region (right end region in the present preferred embodiment) of the main body portion 88a. The headrest portion 19a of the seat unit 18 is attached to the mounting portion 88b. The connecting portion 88c is connected detachably from/attachably to the connecting portion 82b of the side cage member 82. Specifically, the connecting portion 88c is connected to the connecting portion 82b of the side cage member 82 with unillustrated fasteners (such as bolts and nuts), for example. The connecting portion 88d is connected to a connecting portion 90d, which will be described later, of the support member 90 with unillustrated fasteners (such as bolts and nuts), for example.

Referring to FIG. 5 and FIG. 8, the support member 90 includes a main body portion 90a which has a shape of an inverted letter of U or a shape substantially of an inverted letter of U, in a front view; a mounting portion 90b located at an upper end region, i.e., an intermediate region, of the main body portion 90a; and a mounting portion 90c which extends obliquely upward from the main body portion 90a on a side closer to the support member 88 when viewed from the mounting portion 90b.

Referring to FIG. 5, the headrest portion 19b of the seat unit 18 is attached to the mounting portion 90b. To the mounting portion 90c, a seat belt shoulder anchor (not illustrated) for the center seat 18b, for example, is attached.

The support member 90 further includes a pair of connecting portions 90d, 90e fixed to the main body portion 90a. The connecting portion 90d is on a side closer to the support member 88 than the mounting portion 90c when viewed from the mounting portion 90b, whereas the connecting portion 90e is on a side closer to the support member 92 when viewed from the mounting portion 90b. As has been described earlier, the connecting portion 90d is connected to the connecting portion 88d of the support member 88. The connecting portion 90e is connected to a connecting portion 92d, which will be described later, of the support member 92 with unillustrated fasteners (such as bolts and nuts), for example.

Referring to FIG. 5, the support member 90 further includes a pair of connecting portions 90f, 90g (see FIG. 6 and FIG. 8) fixed to two end portions (lower end regions) of the main body portion 90a. The main body portion 90a has these two end regions connected detachably from/attachably to the side frame portions 50a, 50b via the pair of connecting portions 90f, 90g. Specifically, the pair of connecting portions 90f, 90g of the support member 90 are connected to the side frame portions 50a, 50b, with unillustrated fasteners (such as bolts and nuts), for example.

The support member 92 includes a main body portion 92a extending in a left-right direction; a mounting portion 92b fixed to an intermediate region of the main body portion 92a; a connecting portion 92c fixed to an end region (right end region in the present preferred embodiment) of the main body portion 92a; and a connecting portion 92d fixed to another end region (left end region in the present preferred embodiment) of the main body portion 92a. To the mounting portion 92b, a headrest portion 19c of the seat unit 18 is attached. The connecting portion 92c is connected detachably from/attachably to the connecting portion 83b of the side cage member 83. Specifically, the connecting portion 92c is connected to the connecting portion 83b of the side cage member 83 with unillustrated fasteners (such as bolts and nuts) for example. As has been described earlier, the connecting portion 92d is connected to the connecting portion 90e of the support member 90.

Due to the arrangement described above, the cross member portion 86 is attached detachably from/attachably to the side frame portions 50a, 50b of the frame portion 16 and the side cage members 82, 83 of the roll-over protection cage 22.

Referring to FIG. 9 through FIG. 13, the vehicle 10 further includes a pair of suspension assemblies 94a, 94b which suspend the pair of front wheels 12 (see FIG. 1); a rotation transmission portion 96 which transmits rotation from an engine 178 (see FIG. 16) to be described later to the pair of front wheels 12; a pair of suspension assemblies 98a, 98b which suspend the pair of rear wheels 14 (see FIG. 1); a rotation transmission portion 100 which transmits rotation from the engine 178 to the pair of rear wheels 14; and a rear stabilizer 102 which connects the suspension assemblies 98a, 98b to each other. The frame portion 16 (see FIG. 1) is supported by the pair of front wheels 12 and the pair of rear wheels 14 via the suspension assemblies 94a, 94b, 98a, 98b. In the present preferred embodiment, the suspension assemblies 94a, 94b, 98a, 98b preferably are double wishbone type suspension assemblies, for example.

Figure 10:
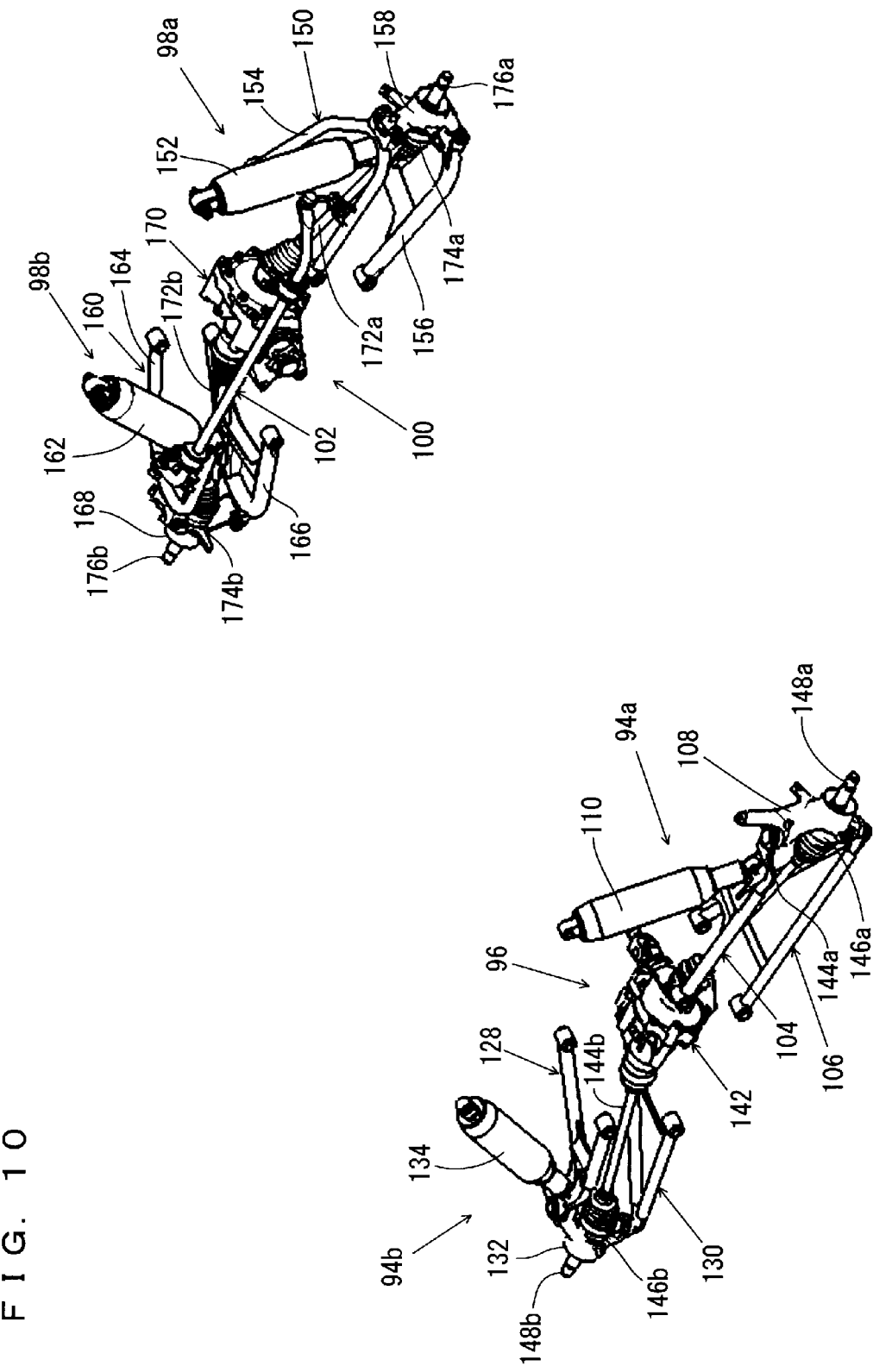
FIG. 10 is a perspective view showing the pair of suspension assemblies for front wheels and the pair of suspension assemblies for rear wheels.
Figure 11:
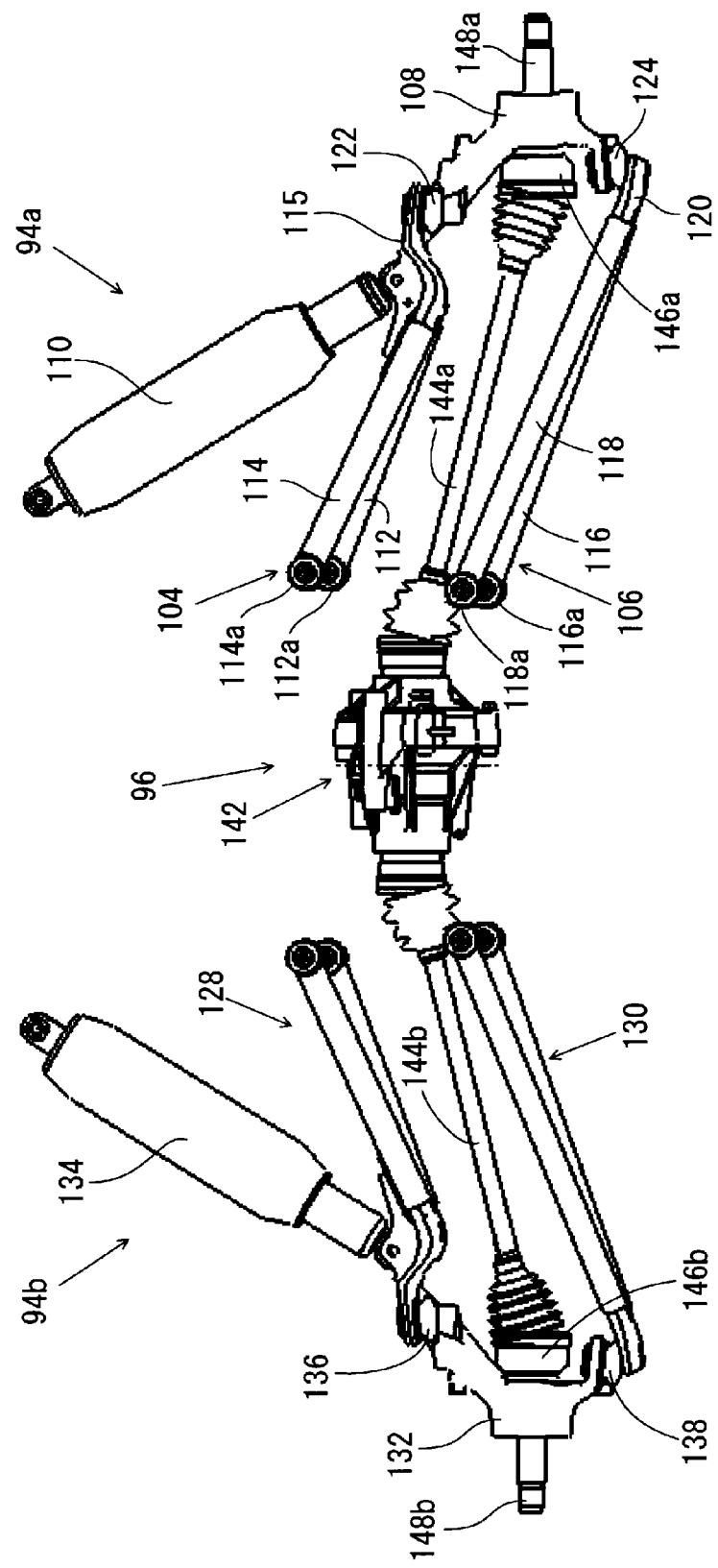
FIG. 11 is a front view showing the pair of suspension assemblies for front wheels and the rotation transmission portion for the front wheels.

Referring to FIG. 10 and FIG. 11, the suspension assembly 94a includes an upper arm 104, a lower arm 106, a knuckle arm 108 and a shock absorber 110. The upper arm 104 and the lower arm 106 are provided by A arms for example.

Referring to FIG. 11, the upper arm 104 includes a rear arm portion 112 which includes a first end portion 112a; a front arm portion 114 which includes a second end portion 114a and is at a more forward position than the rear arm portion 112; and a connecting portion 115 which connects the rear arm portion 112 and the front arm portion 114 to each other.

The first end portion 112a is an end region (right end region in the present preferred embodiment) of the rear arm portion 112, whereas the second end portion 114a is an end region (right end region in the present preferred embodiment) of the front arm portion 114. The connecting portion 115 connects another end region (left end region in the present preferred embodiment) of the rear arm portion 112 and another end region (left end region in the present preferred embodiment) of the front arm portion 114 to each other.

The lower arm 106 includes a rear arm portion 116 which includes a first end portion 116a; a front arm portion 118 which includes a second end portion 118a and is at a more forward position than the rear arm portion 116; and a connecting portion 120 which connects the rear arm portion 116 and the front arm portion 118 to each other.

The first end portion 116a is an end region (right end region in the present preferred embodiment) of the rear arm portion 116, whereas the second end portion 118a is an end region (right end region in the present preferred embodiment) of the front arm portion 118. The connecting portion 120 connects another end region (left end region in the present preferred embodiment) of the rear arm portion 116 and another end region (left end region in the present preferred embodiment) of the front arm portion 118 to each other.

Figure 9:
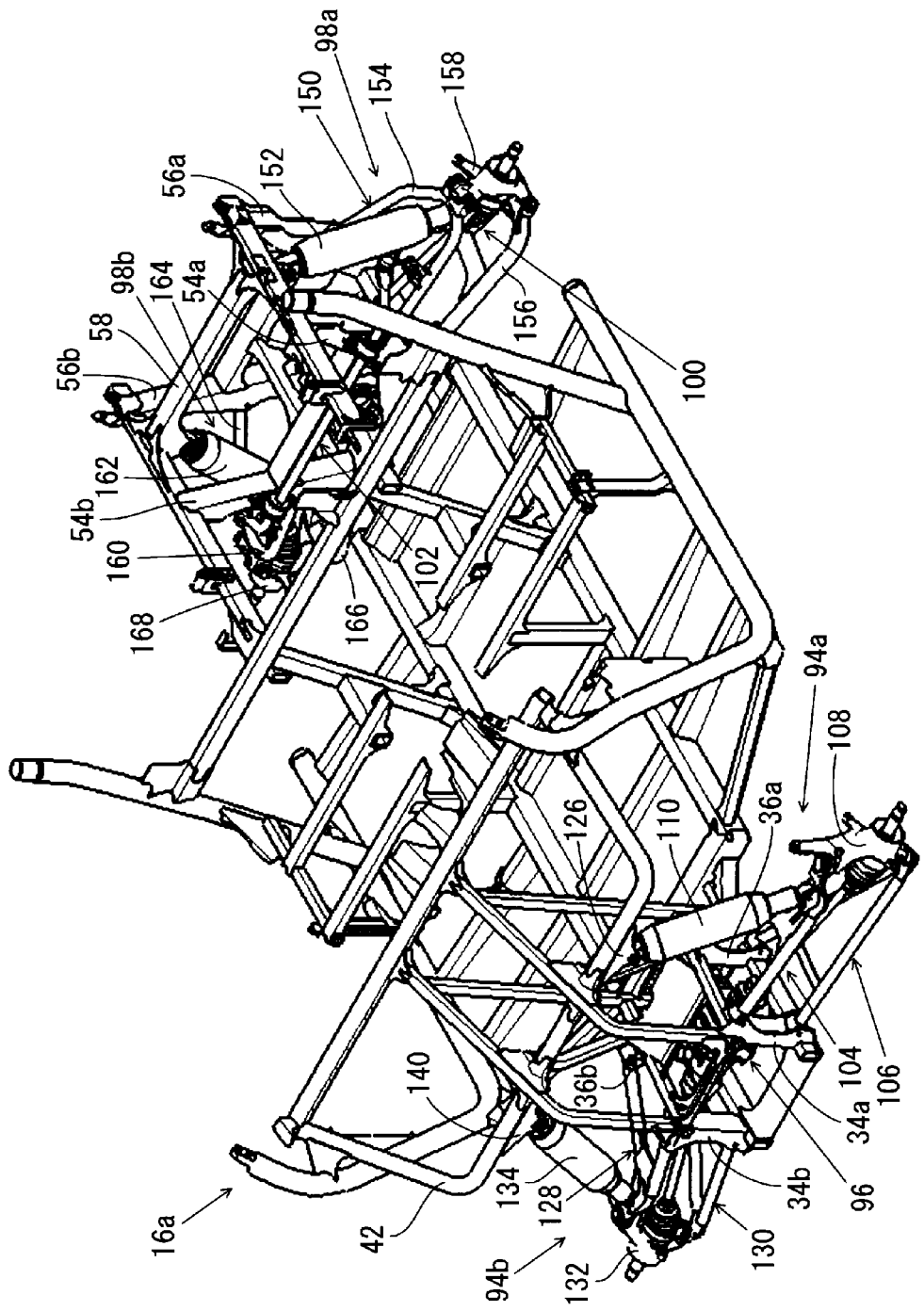
FIG. 9 is a perspective view of the main frame portion, a pair of suspension assemblies for front wheels, a rotation transmission portion for the front wheels, a pair of suspension assemblies for rear wheels, and a rotation transmission portion for the rear wheels.

Referring to FIG. 9, the upper arm 104 is supported by the support frame portions 34a, 36a pivotably in an up-down direction. More specifically, referring to FIG. 11, the first end portion 112a of the rear arm portion 112 is pivotably supported at an upper end region of the support frame portion 36a (see FIG. 9), whereas the second end portion 114a of the front arm portion 114 is pivotably supported at an upper end region of the support frame portion 34a (see FIG. 9).

Referring to FIG. 9, the lower arm 106 is supported by the support frame portions 34a, 36a pivotably in an up-down direction at a lower position than the upper arm 104. More specifically, referring to FIG. 11, the first end portion 116a of the rear arm portion 116 is pivotably supported at a lower end region of the support frame portion 36a (see FIG. 9), whereas the second end portion 118a of the front arm portion 118 is pivotably supported at a lower end region of the support frame portion 34a (see FIG. 9).

The connecting portion 115 of the upper arm 104 is connected to an upper end region of the knuckle arm 108 via a ball joint 122, whereas the connecting portion 120 of the lower arm 106 is connected to a lower end region of the knuckle arm 108 via a ball joint 124. Thus, the upper arm 104 and the lower arm 106 are pivotable in an up-down direction with respect to the knuckle arm 108. Also, the knuckle arm 108 is pivotable in a fore-aft direction with respect to the upper arm 104 and the lower arm 106.

The shock absorber 110 has a lower end region supported pivotably in a left-right direction by the upper arm 104 (the connecting portion 115). Referring to FIG. 9, the shock absorber 110 has an upper end region supported pivotably in a left-right direction by the U-shaped or substantially U-shaped frame portion 42 via a support member 126. Referring to FIG. 6, the support member 126 has a shape of an inverted letter of U or substantially in the shape of an inverted letter of U in a side view, and is fixed to the U-shaped or substantially U-shaped frame portion 42.

Referring to FIG. 10 and FIG. 11, the suspension assembly 94b is symmetrical to the suspension assembly 94a in a left-right direction, and includes an upper arm 128, a lower arm 130, a knuckle arm 132, and a shock absorber 134. The knuckle arm 132 is connected to the upper arm 128 and the lower arm 130 via ball joints 136, 138.

The shock absorber 134 has a lower end region supported by the upper arm 128 pivotably in a left-right direction. Referring to FIG. 9, the shock absorber 134 has an upper end region supported pivotably in a left-right direction by the U-shaped or substantially U-shaped frame portion 42 via a support member 140. Like the support member 126, the support member 140 has a shape of an inverted letter of U in a side view or substantially a shape of an inverted letter of U, and is fixed to the U-shaped or substantially U-shaped frame portion 42.

Referring to FIG. 10 and FIG. 11, the rotation transmission portion 96 includes a differential device 142, a pair of drive shafts 144a, 144b, a pair of constant-velocity joints 146a, 146b, and a pair of axles 148a, 148b. The differential device 142 is between the suspension assembly 94a and the suspension assembly 94b in the width direction of the vehicle 10. The differential device 142 is supported by the main frame portion 16a. The differential device 142 is connected to the engine 178 (see FIG. 16) which will be described later, via a propeller shaft 180 (see FIG. 16) which will be described later. The drive shafts 144a, 144b connect the differential device 142 with the constant-velocity joints 146a, 146b. The constant-velocity joint 146a and the axle 148a are connected to each other and are supported rotatably by the knuckle arm 108. The constant-velocity joint 146b and the axle 148b are connected to each other and are supported rotatably by the knuckle arm 132. The axle 148a supports the left front wheel 12 (see FIG. 1), whereas the axle 148b supports the right front wheel 12 (see FIG. 1).

The suspension assemblies 98a, 98b and the rotation transmission portion 100 can be any known components, so the suspension assemblies 98a, 98b and the rotation transmission portion 100 will be described only briefly.

Figure 12:
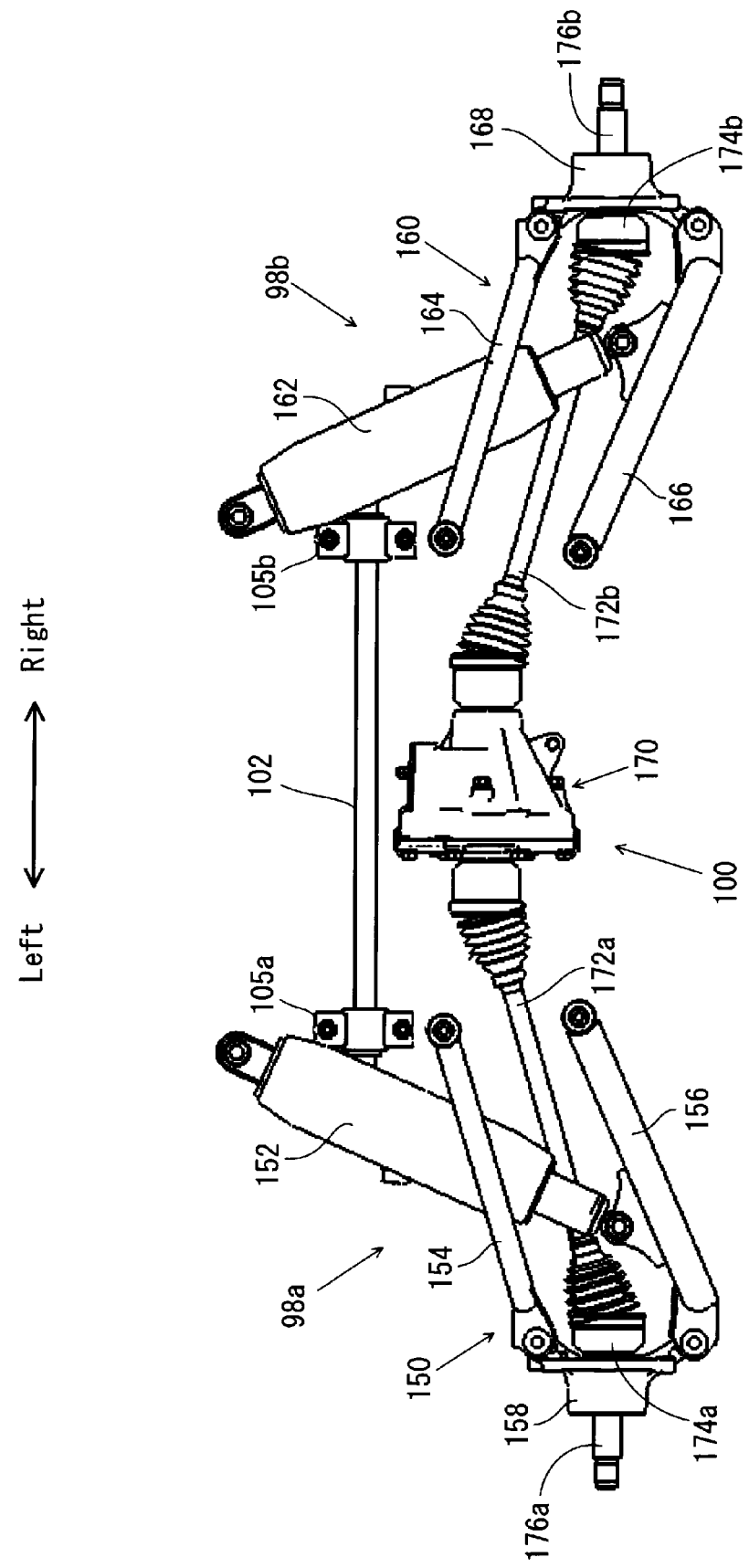
FIG. 12 is a rear view showing the pair of suspension assemblies for rear wheels, the rotation transmission portion for the rear wheels, and a rear stabilizer.
Figure 13:
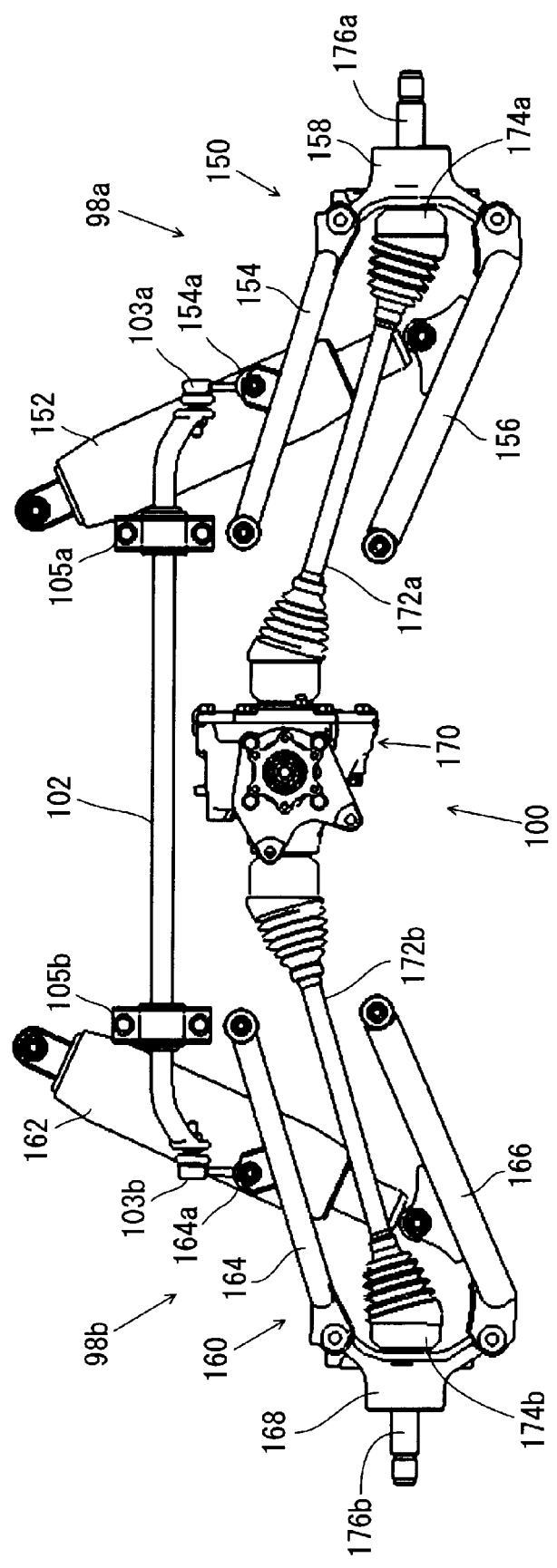
FIG. 13 is a front view showing the pair of suspension assemblies for rear wheels, the rotation transmission portion for the rear wheels, and the rear stabilizer.

Referring to FIG. 10, FIG. 12 and FIG. 13, the suspension assembly 98a includes an arm portion 150 and a shock absorber 152. In the present preferred embodiment, the arm portion 150 includes an upper arm 154, a lower arm 156 and a knuckle arm 158. Referring to FIG. 9, the upper arm 154 is supported by the support frame portions 54a, 56a pivotably in an up-down direction. The lower arm 156 is supported by the support frame portions 54a, 56a pivotably in an up-down direction at a lower position than the upper arm 154. More specifically, the upper arm 154 is supported at substantially intermediate regions in an up-down direction of the support frame portions 54a, 56a, whereas the lower arm 156 is supported by lower end regions of the support frame portions 54a, 56a. The shock absorber 152 connects the main frame portion 16a and the arm portion 150 (lower arm 156 in the present preferred embodiment) to each other. More specifically, the shock absorber 152 has an upper end region supported pivotably by an end region (left end region in the present preferred embodiment) of the cross member 58, whereas the shock absorber 152 has a lower end region supported pivotably by the lower arm 156.

Referring to FIG. 10, FIG. 12 and FIG. 13, the suspension assembly 98b is symmetrical with the suspension assembly 98a in a left-right direction, and includes an arm portion 160 and a shock absorber 162. In the present preferred embodiment, the arm portion 160 includes an upper arm 164, a lower arm 166 and a knuckle arm 168. Referring to FIG. 9, the upper arm 164 is supported by the support frame portions 54b, 56b pivotably in an up-down direction. The lower arm 166 is supported by the support frame portions 54b, 56b pivotably in an up-down direction at a lower position than the upper arm 164. More specifically, the upper arm 164 is supported at substantially intermediate regions in an up-down direction of the support frame portions 54b, 56b, whereas the lower arm 166 is supported by lower end regions of the support frame portions 54b, 56b. The shock absorber 162 connects the main frame portion 16a and the arm portion 160 (lower arm 166 in the present preferred embodiment) to each other. More specifically, the shock absorber 162 has an upper end region supported pivotably by another end region (right end region in the present preferred embodiment) of the cross member 58, whereas the shock absorber 162 has a lower end region supported pivotably by the lower arm 166.

Referring to FIG. 10, the rear stabilizer 102 is at a more forward position than the shock absorbers 152, 162, and connects the arm portion 150 of the suspension assembly 98a and the arm portion 160 of the suspension assembly 98b to each other. In the present preferred embodiment, the rear stabilizer 102 connects the upper arm 154 and the upper arm 164 to each other. Specifically, referring also to FIG. 12 and FIG. 13, the rear stabilizer 102 has an end region which is connected to a flange portion 154a of the upper arm 154 via a connecting member 103a, whereas the rear stabilizer 102 has another end region which is connected to a flange portion 164a of the upper arm 164 via a connecting member 103b. The rear stabilizer 102 is supported by the pair of support frame portions 54a, 54b. Specifically, the rear stabilizer 102 is fixed to substantially intermediate regions in an up-down direction of the support frame portions 54a, 54b by mounting members 105a, 105b.

Referring to FIG. 10, FIG. 12 and FIG. 13, the rotation transmission portion 100 includes a differential device 170, a pair of drive shafts 172a, 172b, a pair of constant-velocity joints 174a, 174b, and a pair of axles 176a, 176b. The differential device 170 is located between the suspension assembly 98a and the suspension assembly 98b in the width direction of the vehicle 10. The differential device 170 is supported by the main frame portion 16a. The differential device 170 is connected to the engine 178 (see FIG. 16) which will be described later, via a propeller shaft 182 (see FIG. 16) which will be described later.

The drive shafts 172a, 172b extend in the width direction of the vehicle 10, connecting the differential device 170 with the constant-velocity joints 174a, 174b. The constant-velocity joints 174a and the axle 176a are connected to each other and are supported rotatably by the knuckle arm 158. The constant-velocity joints 174b and the axle 176b are connected to each other and are supported rotatably by the knuckle arm 168. The axle 176a supports the left rear wheel (see FIG. 5), whereas the axle 176b supports the right rear wheel 14 (see FIG. 5).

Figure 14:
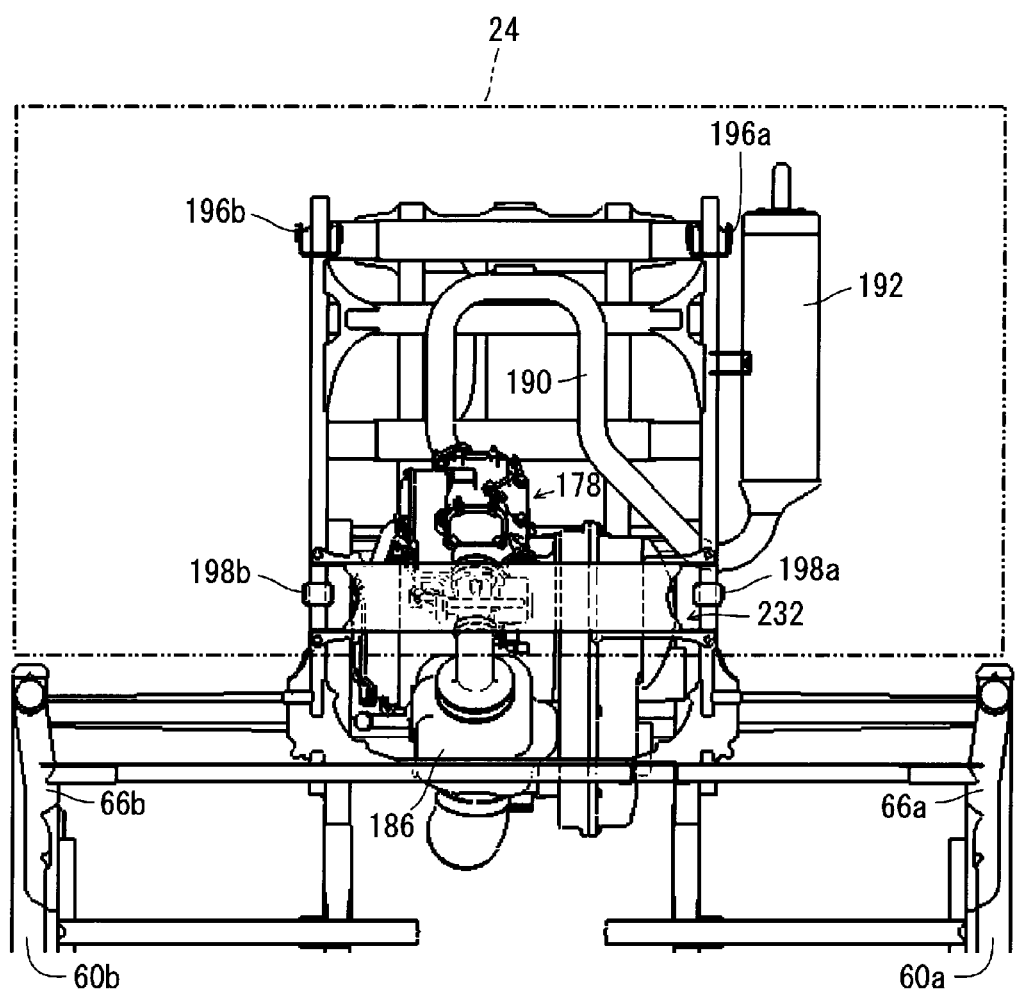
FIG. 14 is a plan view showing a rearward region of the main frame portion, an engine and surrounds thereof.

Referring to FIG. 14 through FIG. 17, the engine 178 is supported at a rearward region of the main frame portion 16a. Referring to FIG. 7 and FIG. 14 thorough FIG. 17, a majority of the engine 178 is within a space surrounded by the side frame portions 25a, 25b, the side frame portions 46a, 46b, the support frame portions 48a, 48b, the side frame portions 50a, 50b, and the support frame portions 54a, 54b. The engine 178 is located at a position behind the seat unit and below the cargo bed 24, being slightly tilted rearward. In the present preferred embodiment, at least a portion of the engine 178 is located at a more rearward position than the roll-over protection cage 22. The engine 178 includes a cylinder portion 178a and a transmission case 178b which is integrated with the cylinder portion 178a. The cylinder portion 178a includes a cylinder head 178c at its top region.

Figure 16:
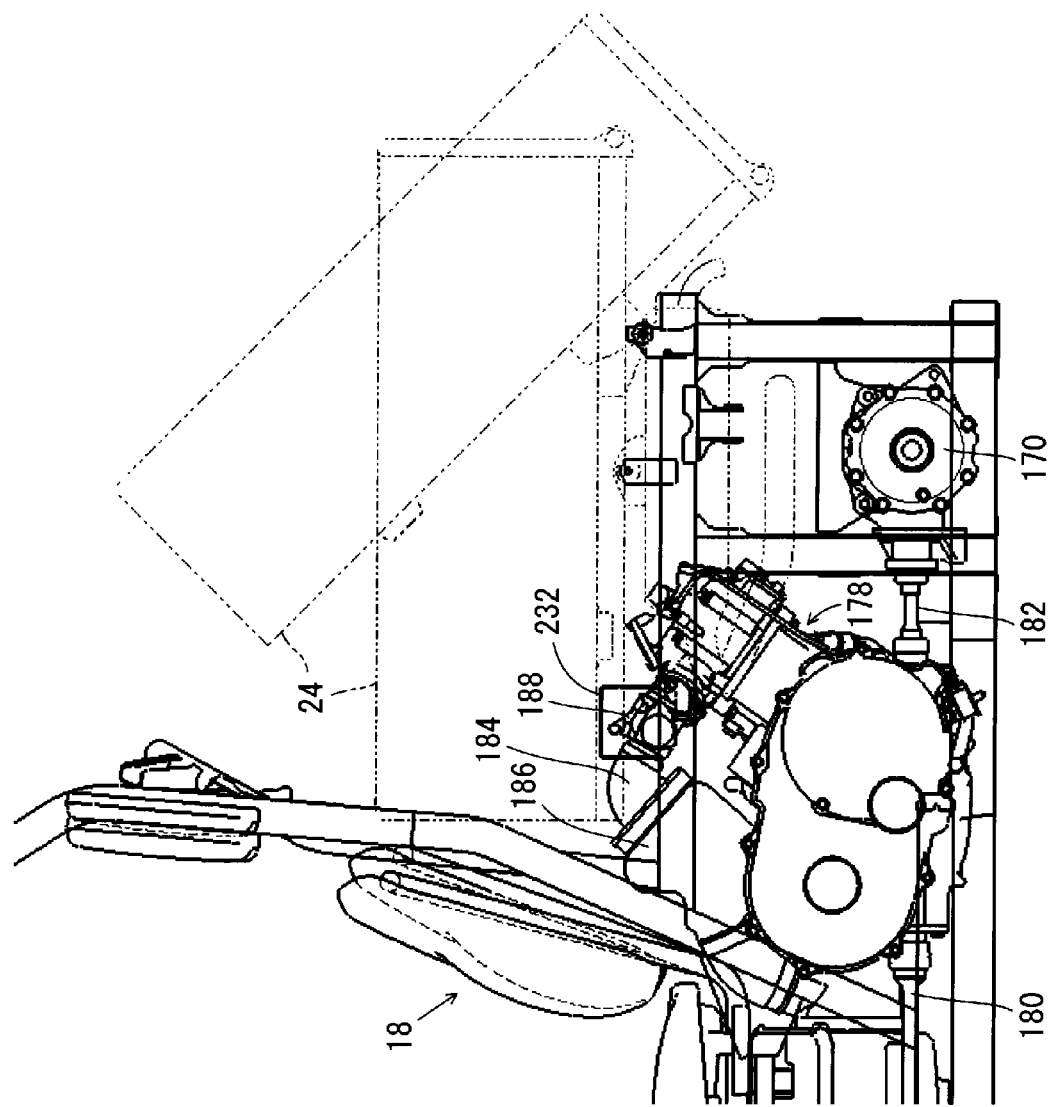
FIG. 16 is a side view showing the rearward region of the main frame portion, the engine and surrounds thereof.
Figure 17:
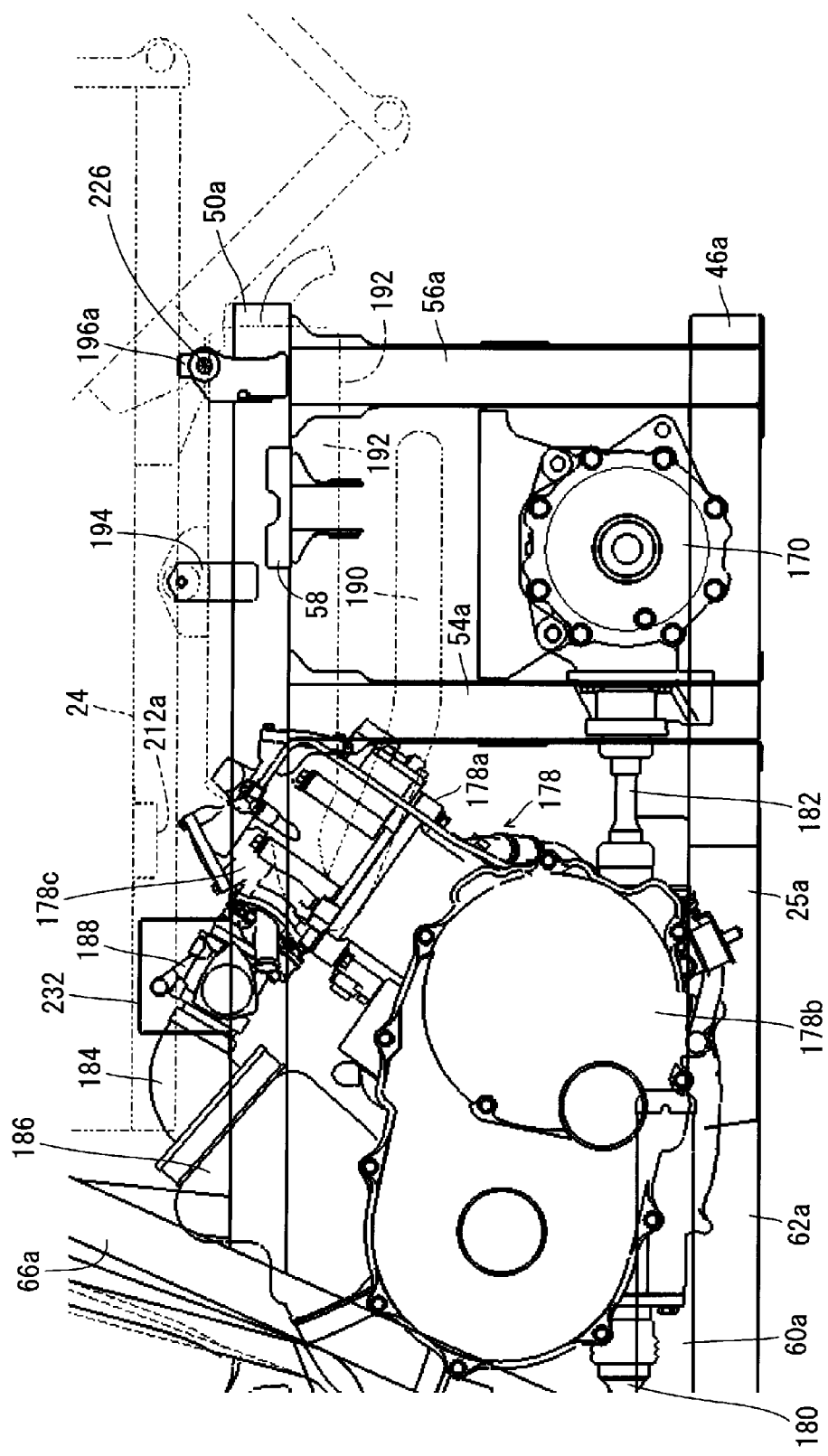
FIG. 17 is an enlarged side view showing the rearward region of the main frame portion, the engine and surrounds thereof.

Referring to FIG. 16 and FIG. 17, at a substantially intermediate region in the width direction of the vehicle 10, the propeller shaft 180 extends forward from a lower end region of the engine 178, whereas the propeller shaft 182 extends rearward from a lower end region of the engine 178. Therefore, the propeller shaft 182 extends in a fore-aft direction in a more rearward region than the engine 178.

The propeller shaft 180 is connected to the differential device 142 (see FIG. 10), whereas the propeller shaft 182 is connected to the differential device 170 (see FIG. 10). Referring to FIG. 11, FIG. 16 and FIG. 17, rotation from the engine 178 is transmitted by the propeller shaft 180, the differential device 142, the drive shafts 144a, 144b, the constant-velocity joints 146a, 146b, and the axles 148a, 148b, to the pair of front wheels 12. Thus, the pair of front wheels 12 are rotated. Also, referring to FIG. 12, FIG. 13, FIG. 16 and FIG. 17, rotation from the engine 178 is transmitted by the propeller shaft 182, the differential device 170, the drive shafts 172a, 172b, the constant-velocity joints 174a, 174b, and the axles 176a, 176b, to the pair of rear wheels 14. Thus, the pair of rear wheels 14 are rotated.

Referring to FIG. 14 through FIG. 17, the cylinder head 178c of the engine 178 is connected to an air cleaner 186 via an air intake tube 184. The air cleaner 186 is at a position forward of the engine 178. The air intake tube 184 is provided with a throttle body 188. The throttle body 188 is one of output adjusters used to adjust an output of the engine 178. The cylinder head 178c is connected to a muffler 192 via an exhaust pipe 190. The muffler 192 is disposed on a left and rear side of the engine 178, on a left side of the side frame portion 50a. The muffler 192 is supported by the side frame portion 50a via a support member 194. In the present preferred embodiment, the engine 178 has all of its cylinder head 178c, air intake tube 184, air cleaner 186, throttle body 188 and muffler 192, protruding partially above the side frame portions 50a, 50b in a side view.

The vehicle 10 further includes a transfer mechanism (not illustrated) which transmits movements of the steering wheel 20 to the pair of front wheels 12. The transfer mechanism can be any known mechanism such as a rack and pinion type transfer mechanism for example, and therefore will not be described herein.

Figure 2:
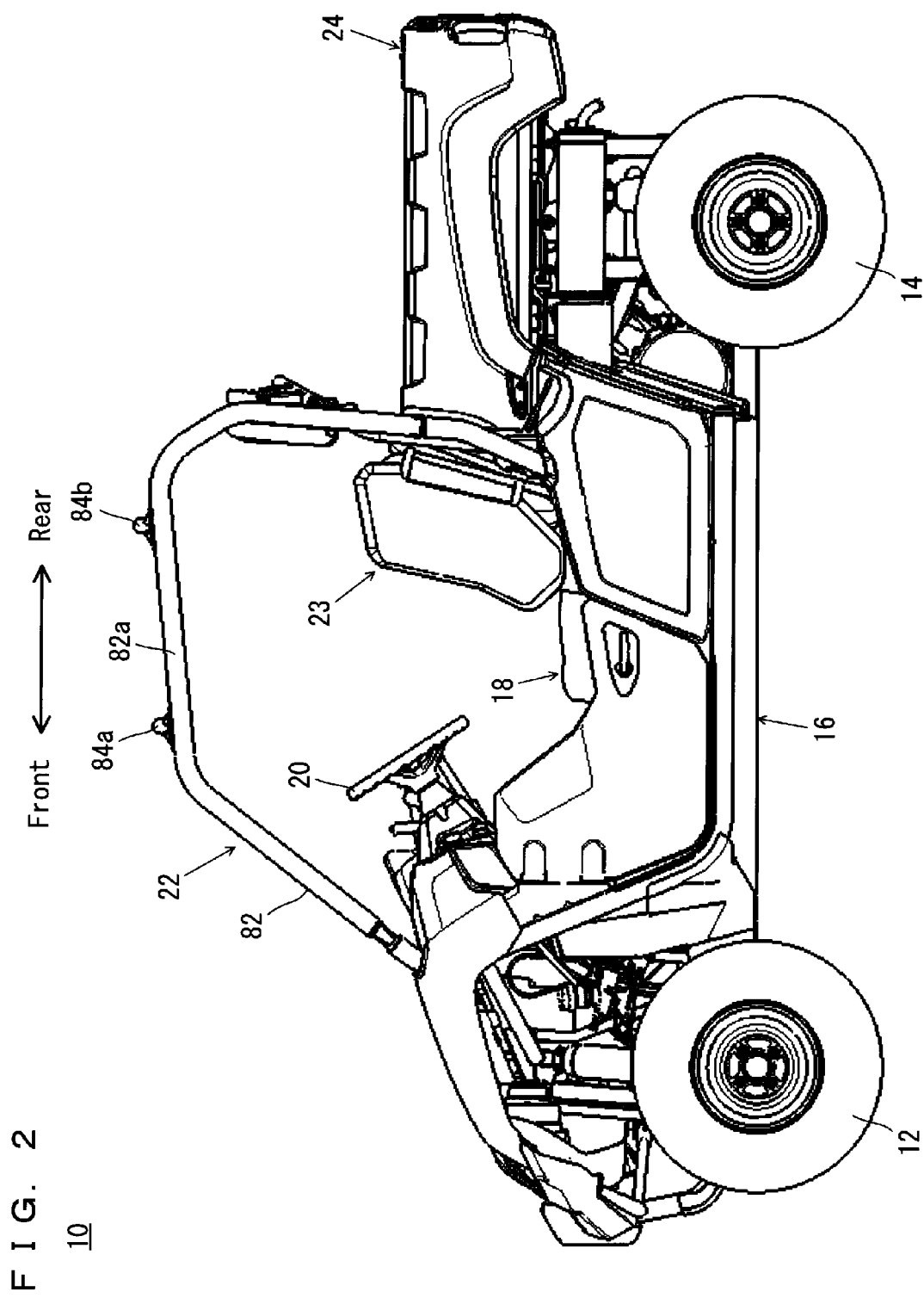
FIG. 2 is a side view of the vehicle.

Referring to FIG. 2, FIG. 6 and FIG. 7, the pair of side frame portions 50a, 50b which extend in a fore-aft direction below the cargo bed 24 includes a pair of first supporting portions 196a, 196b which support a rear portion of the cargo bed 24 pivotably; and a pair of second supporting portions 198a, 198b which are located at a more forward position than the pair of first supporting portions 196a, 196b and support a forward portion of the cargo bed 24.

Figure 18:
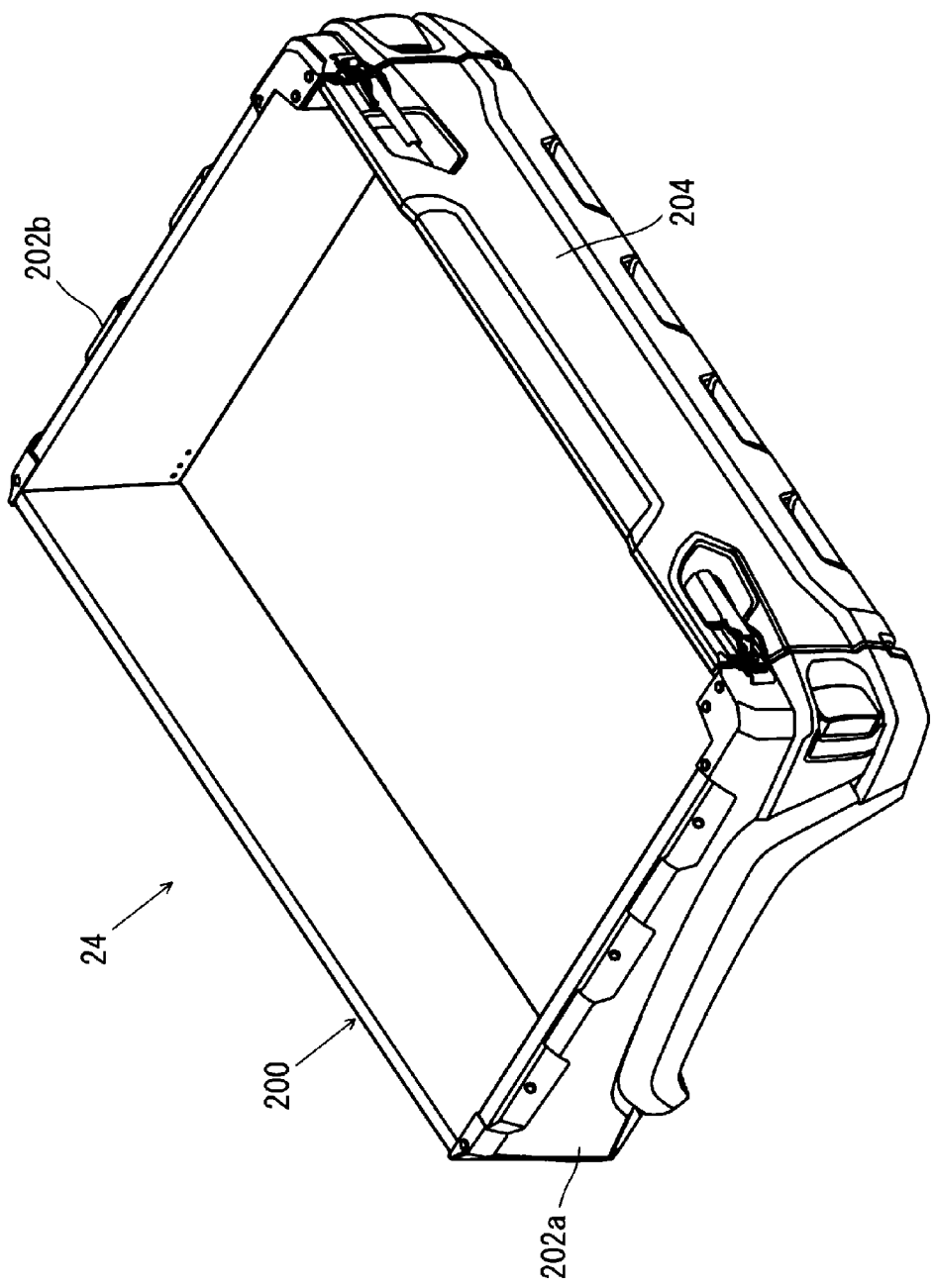
FIG. 18 is a perspective view of a cargo bed from an upper rear view point.
Figure 19:
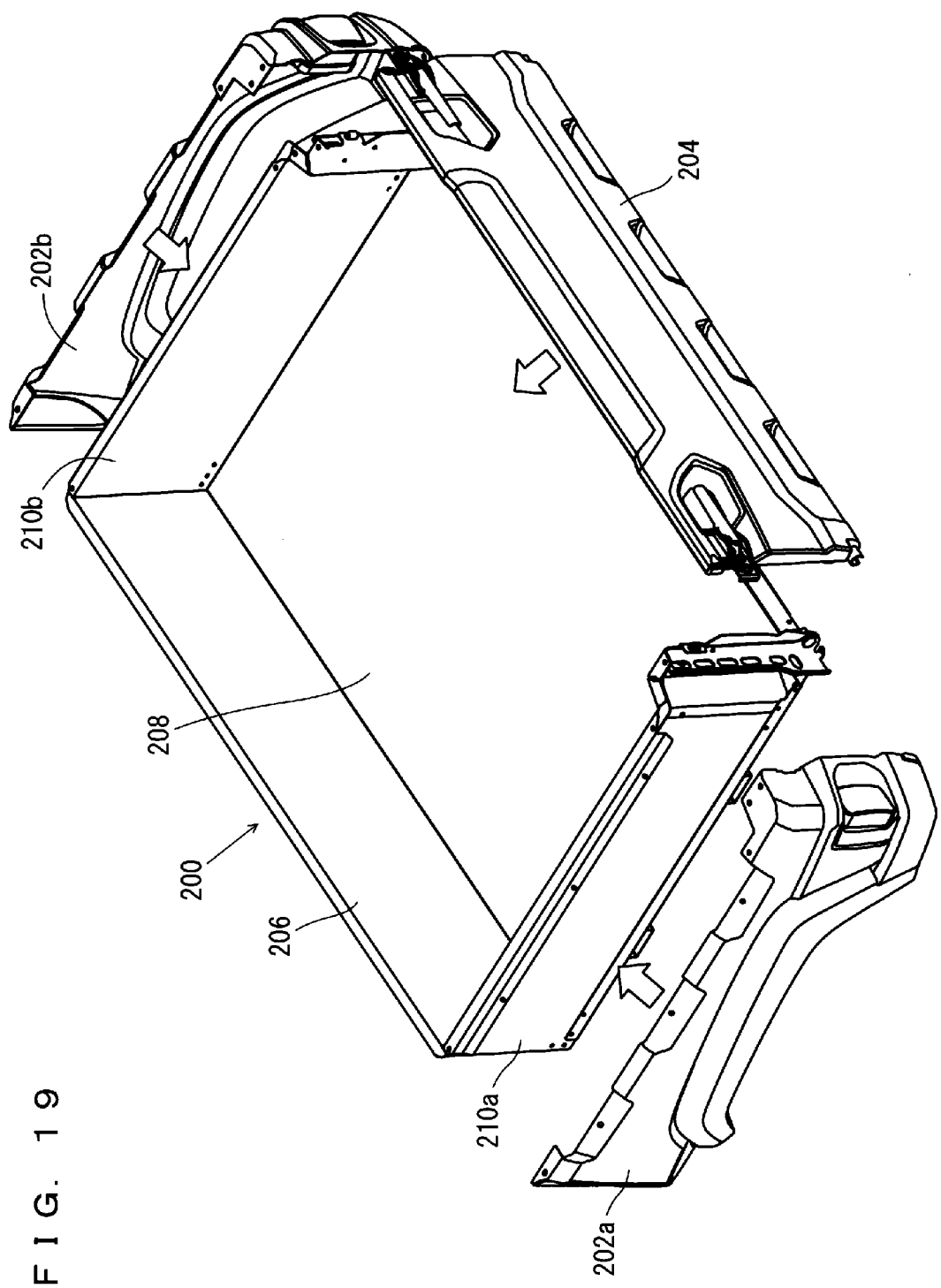
FIG. 19 is an exploded perspective view of the cargo bed from an upper rear view point.
Figure 20:
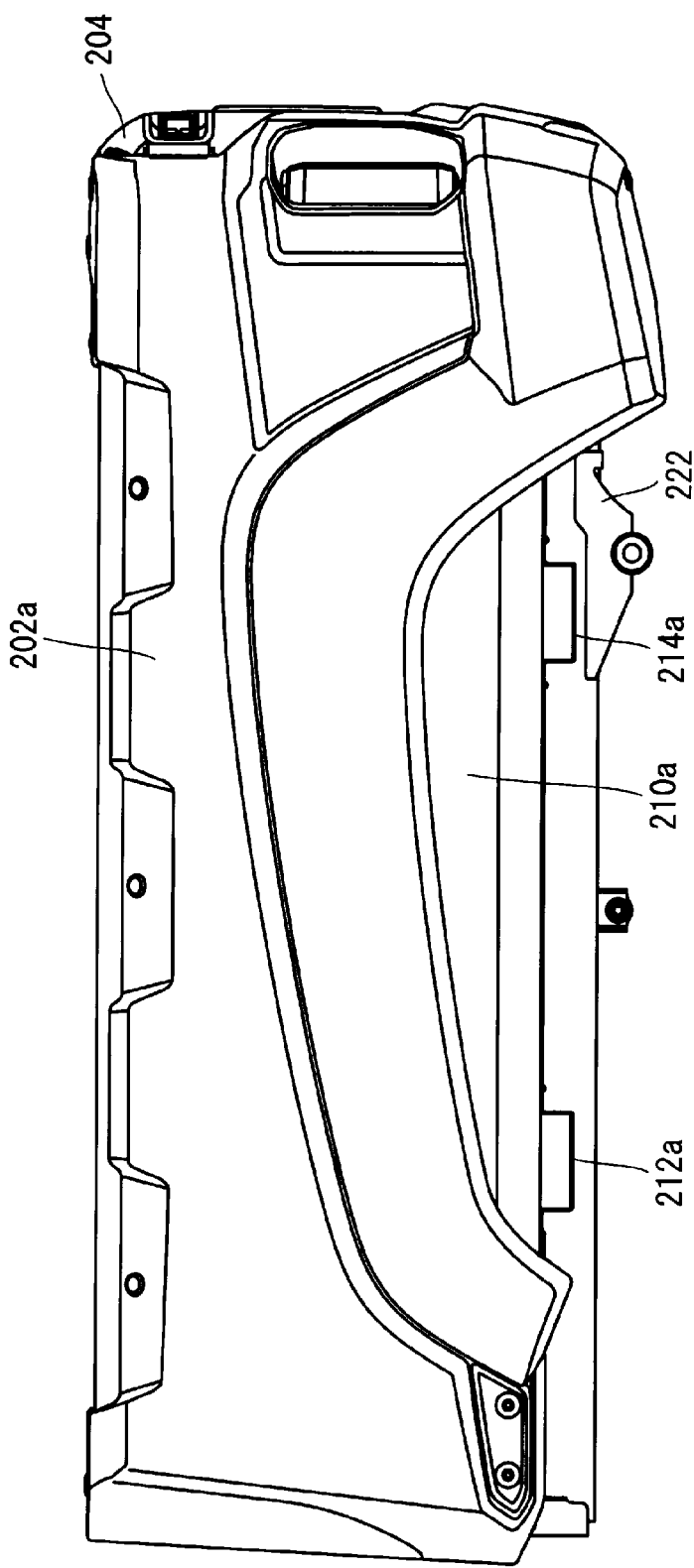
FIG. 20 is a side view of the cargo bed.

Referring to FIG. 18 through FIG. 20, the cargo bed 24 includes a main body portion 200, a pair of rear fenders 202a, 202b and a tail gate 204.

The main body portion 200 contains a metal, for example, as a material and is arranged to define an upward opening box.

The main body portion 200 includes a front wall portion 206, a bottom portion 208 and a pair of side wall portions 210a, 210b. The front wall portion 206 is rectangular or substantially rectangular, extending in an up-down direction and in a left-right direction. The bottom portion 208 is rectangular or substantially rectangular, extending rearward from a lower edge region of the front wall portion 206. The pair of side wall portions 210a, 210b are rectangular or substantially rectangular, extending upward from respective edge regions of the bottom portion 208 in a left-right direction and connected to respective edge regions of the front wall portion 206 in the left-right direction.

Figure 21:
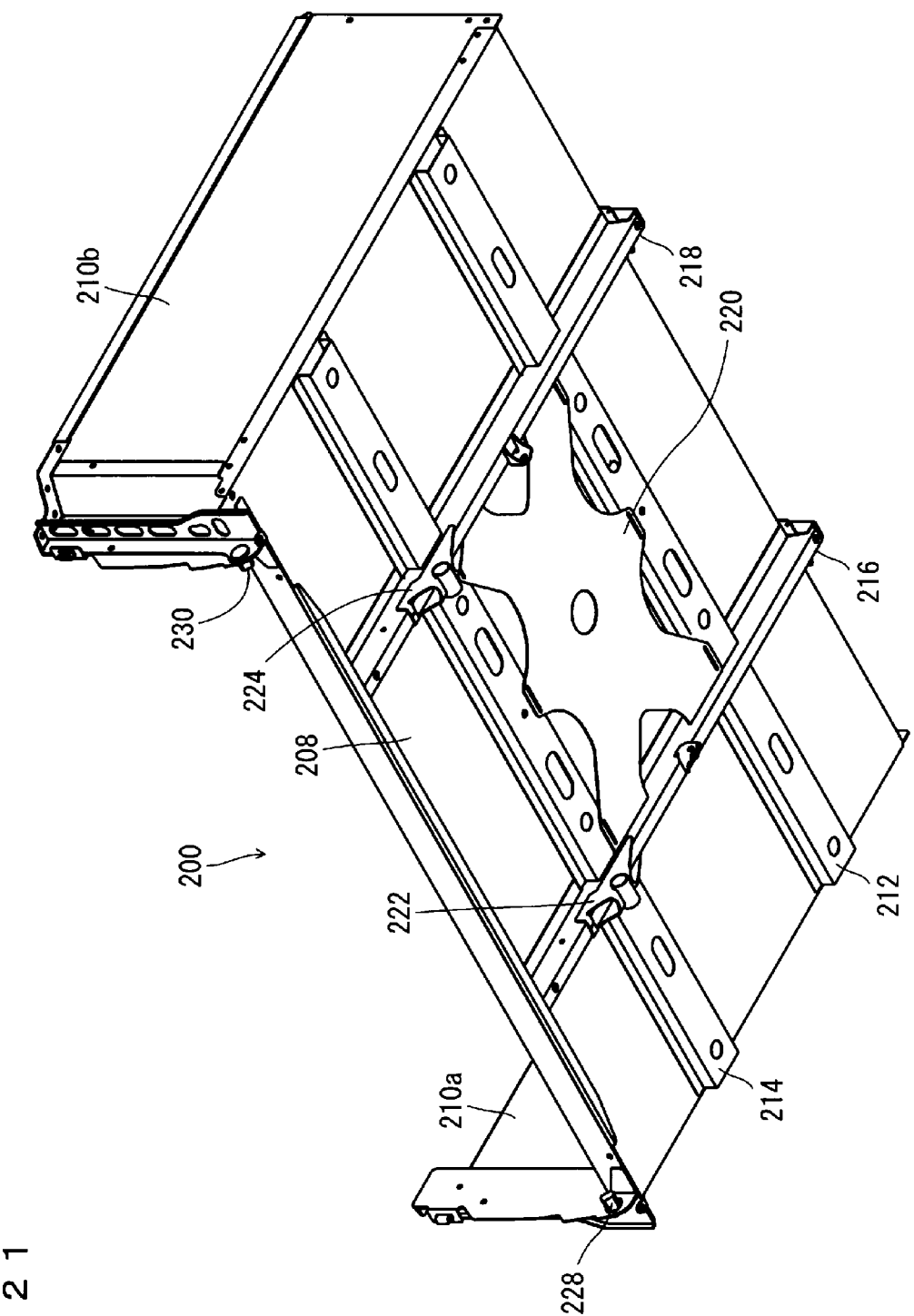
FIG. 21 is a perspective view of a main body portion of the cargo bed from a lower rear view point.
Figure 22:
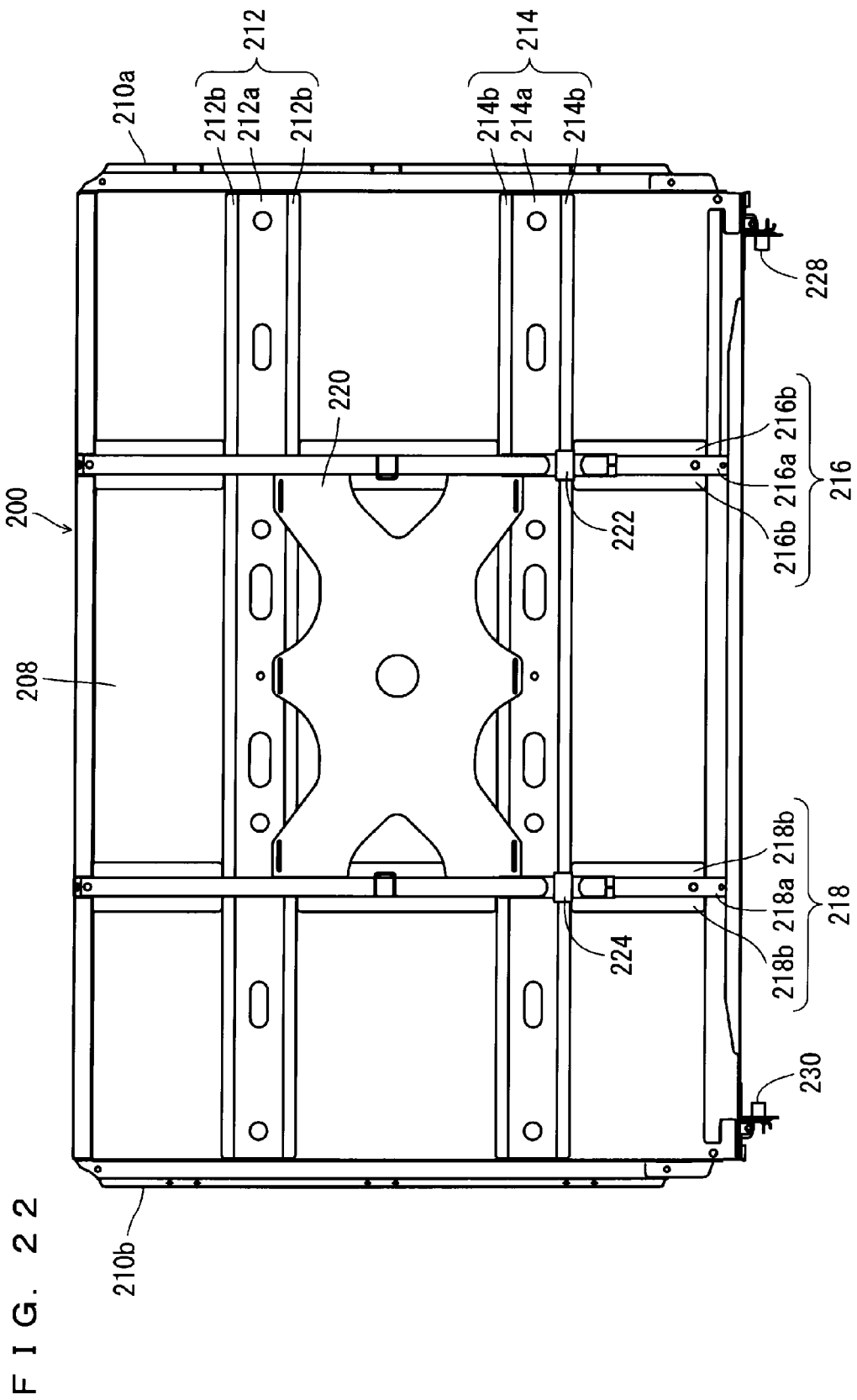
FIG. 22 is a bottom view of the main body portion of the cargo bed.
Figure 23:
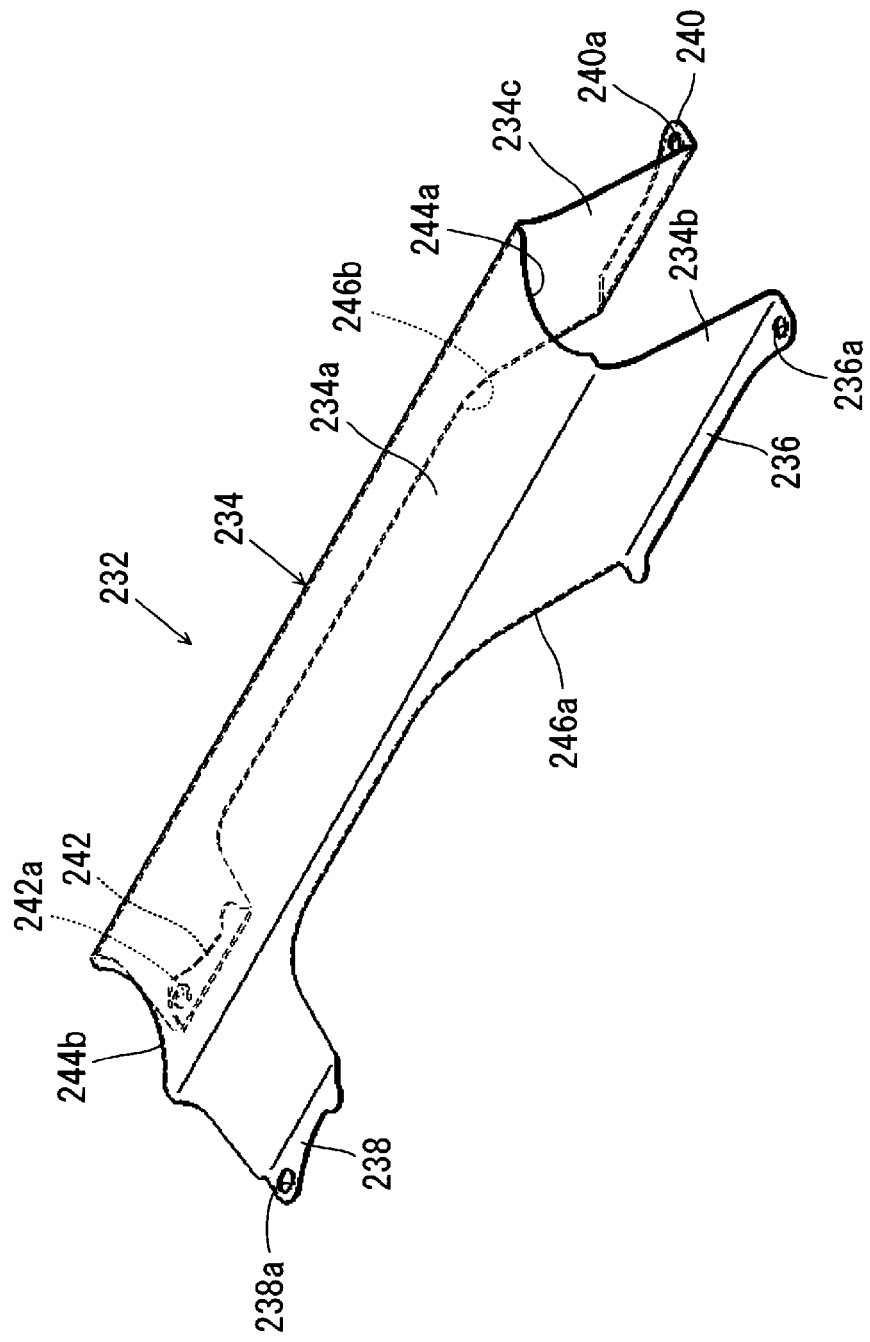
FIG. 23 is a perspective view of a protective member.

Referring to FIG. 21 and FIG. 22, the bottom portion 208 of the main body portion 200 has a lower surface with reinforcing portions 212, 214 which extend in the width direction of the vehicle 10. The reinforcing portions 212, 214 are, for example, platy members each having a U-shaped or substantially U-shaped section, and disposed parallel or substantially parallel to each other at an interval in the fore-aft direction of the vehicle 10. Specifically, the reinforcing portion 212 includes a protruding portion 212a and mounting portions 212b on two side of the protruding portion 212a. The mounting portions 212b are attached to the lower surface of the bottom portion 208, whereas the protruding portion 212a protrudes downward from the mounting portions 212b. Likewise, the reinforcing portion 214 includes a protruding portion 214a and mounting portions 214b on two side of the protruding portion 214a. The mounting portions 214b are attached to the lower surface of the bottom portion 208, whereas the protruding portion 214a protrudes downward from the mounting portions 214b. In the present preferred embodiment, the reinforcing portions 212, 214 are identical with each other.

The bottom portion 208 of the main body portion 200 has its lower surface provided with reinforcing portions 216, 218 which are disposed at a right angle across the reinforcing portions 212, 214 (in the fore-aft direction of the vehicle 10). The reinforcing portions 216, 218 are, for example, platy members each having a U-shaped or substantially U-shaped section, and disposed parallel or substantially parallel to each other at an interval in the width direction of the vehicle 10. Specifically, the reinforcing portion 216 includes a protruding portion 216a and mounting portions 216b on two side of the protruding portion 216a. The mounting portions 216b are attached to the lower surface of the bottom portion 208, whereas the protruding portion 216a protrudes downward from the mounting portions 216b. Likewise, the reinforcing portion 218 includes a protruding portion 218a and mounting portions 218b on two side of the protruding portion 218a. The mounting portions 218b are attached to the lower surface of the bottom portion 208, whereas the protruding portion 218a protrudes downward from the mounting portions 218b. In the present preferred embodiment, the reinforcing portions 216, 218 are identical with each other.

The lower surface of the bottom portion 208 in the main body portion 200 has an intermediate region provided with platy reinforcing portion 220 which connects the reinforcing portions 212, 214, 216 and 218 to each other.

Also, flange portions 222, 224 are attached respectively to the protruding portions 216a, 218a of the reinforcing portions 216, 218. Each of the flange portions 222, 224 is connected to corresponding one of the first supporting portions 196a, 196b on the side frames 50a, 50b via a connecting member 226 (see FIG. 17). Thus, the cargo bed 24 is pivotable in an up-down direction around an axis defined by the connecting members. In other words, the cargo bed 24 is supported pivotably by the frame portion 16, behind the roll-over protection cage 22.

The side wall portions 210a, 210b of the main body portion 200 have their rearward end regions provided with connecting members 228, 230 respectively. The side wall portions 210a, 210b and the tail gate 204 are connected to each other via the connecting members 228, 230. Thus, the tail gate 204 is openable/closable as it is attached to the rearward end regions of the pair of side wall portions 210a, 210b. The tail gate 204 is made of materials which contain a metal and a resin, for example. The pair of rear fenders 202a, 202b are made of materials containing a resin, for example, and are attached to the pair of side wall portions 210a, 210b.

Referring to FIG. 14 through FIG. 17 and FIG. 23, the side frame portions 50a, 50b are connected to each other by a protective member 232. The protective member 232 is made of materials containing a metal and/or a resin, for example. The protective member 232 includes a main body portion 234 and mounting portions 236, 238, 240 and 242. The main body portion 234 is a platy member having a section shaped in an inverted letter of U or substantially in an inverted letter of U, and extends in the width direction of the vehicle 10. The main body portion 234 has its two end regions provided with an longitudinally inward recessing cutouts 244a, 244b. The main body portion 234 includes a long, generally rectangular upper region 234a, a forward region 234b extending downward from a forward edge of the upper region 234a, and a rearward region 234c extending downward from a rearward edge of the upper region 234a. The forward region 234b has a cutout 246a provided at a substantially intermediate region thereof. The rearward region 234b has a cutout 246b provided at a substantially intermediate region thereof. The mounting portions 236, 238 extend forward from lower edges at two end areas of the forward region 234b. The mounting portions 240, 242 extend rearward from lower edges at two end areas of the rearward region 234c. The mounting portions 236, 238, 240 and 242 are provided with holes 236a, 238a, 240a and 242a, respectively, for unillustrated fasteners such as bolts.

Figure 15:
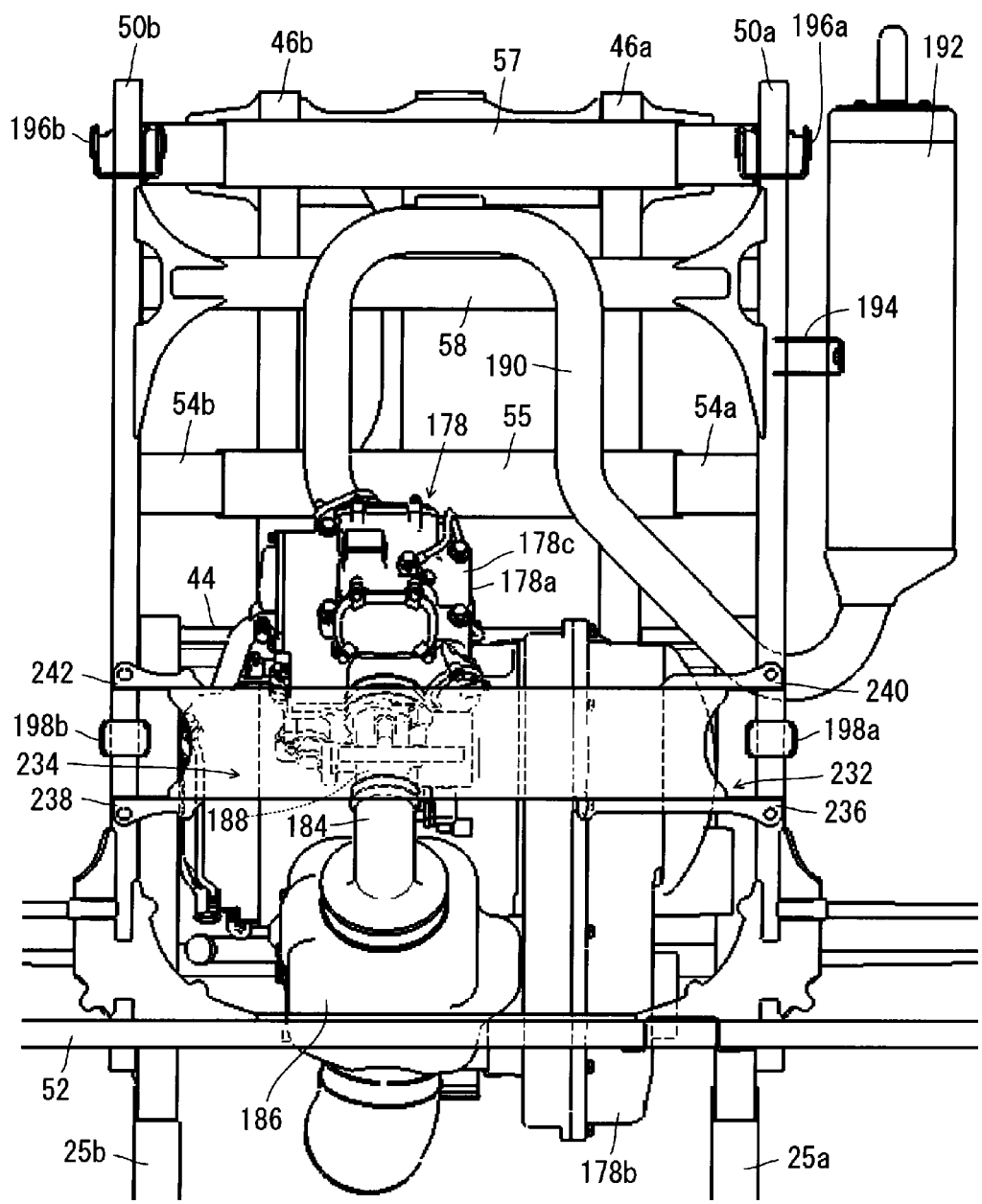
FIG. 15 is an enlarged plan view showing the rearward region of the main frame portion, the engine and surrounds thereof.

Referring to FIG. 15, the protective member 232 is arranged such that the mounting portions 236, 240 are on the side frame portion 50a; the mounting portions 238, 242 are on the side frame portion 50b; and the main body portion 234 provides covering above the throttle body 188. Under this state, the second support member 198a is between the two mounting portions 236, 240, whereas the second support member 198b is between the two mounting portions 238, 242. Under this state, respective fasteners are inserted through the holes 236a, 238a, 240a and 242a to attach to the side frame portions 50a, 50b, such that the protective member 232 is fixed to upper surfaces of the side frame portions 50a, 50b. Thus, the protective member 232 is supported by the frame portion 16a. By removing the fasteners, the protective member 232 can be detached from the frame portion 16a and attached again by using the fasteners.

Referring to FIG. 17, under the state that the protective member 232 is attached to the side frame portions 50a, 50b, the protective member 232 has its upper end at a higher position than the side frame portions 50a, 50b, and the protective member 232 is between the cargo bed 24 and the throttle body 188. Referring to FIG. 15, in a plan view, the protective member 232 overlaps at least a portion of the throttle body 188 and does not overlap at least a portion of the engine 178 (cylinder head 178c). Further, referring to FIG. 17 and FIG. 20, in a plan view, the protruding portions 212a, 214a of the cargo bed 24 do not overlap either of the throttle body 188 and the protective member 232.

According to the vehicle 10 as has been described thus far, the protective member 232 overlaps at least a portion of the throttle body 188 in a plan view. In this arrangement, even if a tool or other object is left or lodged between the throttle body 188 and the cargo bed 24 after maintenance operations have been finished, contact between the tool or other object and the throttle body 188 is significantly reduced or prevented by the protective member 232 when the cargo bed 24 is lowered back into the original position. Specifically, the protective member 232 protects the throttle body 188. On the other hand, the protective member 232 does not overlap at least a portion of the engine 178 in a plan view. In other words, at least a portion of the engine 178 is exposed from the protective member 232 in a plan view. This allows maintenance operations of the engine 178 to be made easily from above the engine 178.

In a plan view, the protruding portions 212a, 214a of the cargo bed 24 do not overlap the throttle body 188. In other words, the protruding portions 212a, 214a and the throttle body 188 are not disposed at the same position in a fore-aft direction of the vehicle 10. In this case, even if the reinforcing portions 212, 214 are provided in the lower surface of the bottom portion 208 of the cargo bed 24, a decrease in the distance between the cargo bed 24 and the throttle body 188 in an up-down direction is significantly reduced or prevented. Likewise, in a plan view, the protruding portions 212a, 214a do not overlap the protective member 232. In other words, the protruding portions 212a, 214a and the protective member 232 are not disposed at the same position in a fore-aft direction. In this case, even if the reinforcing portions 212, 214 are provided in the lower surface of the bottom portion 208 of the cargo bed 24, a decrease in the distance between the cargo bed 24 and the protective member 232 in an up-down direction is significantly reduced or prevented. As a result, even if the reinforcing portions 212, 214 are provided in the lower surface of the bottom portion 208 of the cargo bed 24, it is possible to make a predetermined clearance between the cargo bed 24 and the throttle body 188, and between the cargo bed 24 and the protective member 232 as well, without increasing the height of the cargo bed 24 (more specifically, the bottom portion 208) from the ground surface.

In a plan view, at least a portion of the cylinder head 178c is exposed from the protective member 232. This makes it easier to perform maintenance operations of the engine 178.

Since the protective member 232 is supported by the frame portion 16, even if there is a load applied from a tool or other object onto the protective member 232, the load is received by the frame portion 16a. In other words, it is possible to reduce transmission of the load which was received by the protective member 232 to the throttle body 188. As a result, the throttle body 188 is sufficiently protected.

Since the protective member 232 connects the pair of side frame portions 50a, 50b to each other, it is possible to sufficiently reduce or prevent transmission of the load received by the protective member 232 to the throttle body 188. Thus, the throttle body 188 is sufficiently protected. Also, the protective member 232 improves rigidity of the pair of side frame portions 50a, 50b.

By providing the first supporting portions 196a, 196b and the second supporting portions 198a, 198b in the side frame portions 50a, 50b so as to support the cargo bed 24, it becomes possible to simplify the structure of the vehicle 10. Since the load of the cargo bed 24 is received by the side frame portions 50a, 50b, the load of the cargo bed 24 born by the protective member 232 is sufficiently reduced. This sufficiently reduces load transfer from the protective member 232 to the throttle body 188. Therefore, it is possible to sufficiently protect the throttle body 188.

By removing the protective member 232, performing maintenance operations to components around the engine 178, including removal/reinstallation of the engine 178 itself becomes easier.

By the arrangement that the top end of the protective member 232 is at a higher position than the side frame portions 50a, 50b, it becomes possible to provide sufficient space around the protective member 232. Hence, even if a tool or other object is left or lodged around the protective member 232, it is possible to sufficiently reduce the case that the tool or other object is pressed onto the throttle body 188 by the cargo bed 24 when the cargo bed 24 is lowered back into the original position. Therefore, it is possible to protect the throttle body 188 sufficiently.

By providing the protective member 232 between the cargo bed 24 and the throttle body 188, it is possible to sufficiently protect the throttle body 188.

It should be noted that in the preferred embodiment described above, the throttle body 188 was used as an example of the output adjuster which adjusts the output of the engine 178, and is provided below the cargo bed 24. However, the output adjuster is not limited to this. The output adjuster may be provided by, e.g., a motor serving as an actuator for a throttle valve inside the throttle body, or may be a fuel injection valve attached to the engine 178. In these cases again, preferably, the protective member 232 is located between the cargo bed 24 and such an output adjuster, overlaps at least a portion of the output adjuster and does not overlap at least a portion of the engine 178 in a plan view. Further preferably, in a plan view, the protruding portions 212a, 214a of the cargo bed 24 do not overlap either of the output adjuster and the protective member 232.

The main body portion 234 of the protective member 232 may have a through-hole. For example, the protective member 232 may be provided with a through-hole above a component which is disposed at the highest position. Then the arrangement provides sufficient clearance above the component. Specifically, a sufficient clearance is provided between an upper end of the component and the bottom surface of the cargo bed 24.

Figure 24:
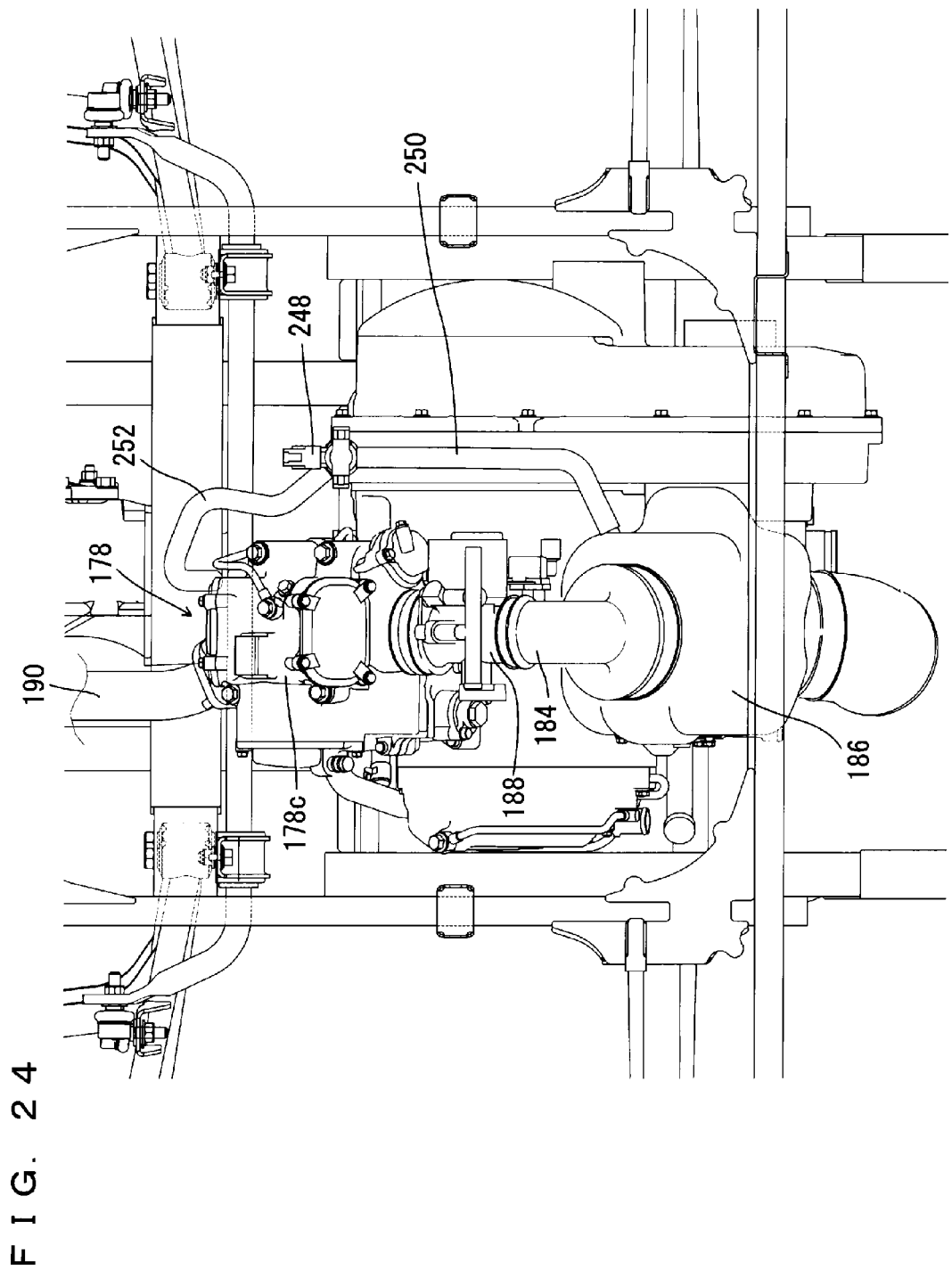
FIG. 24 is a plan view showing the engine, a control valve and their surrounds.
Figure 25:
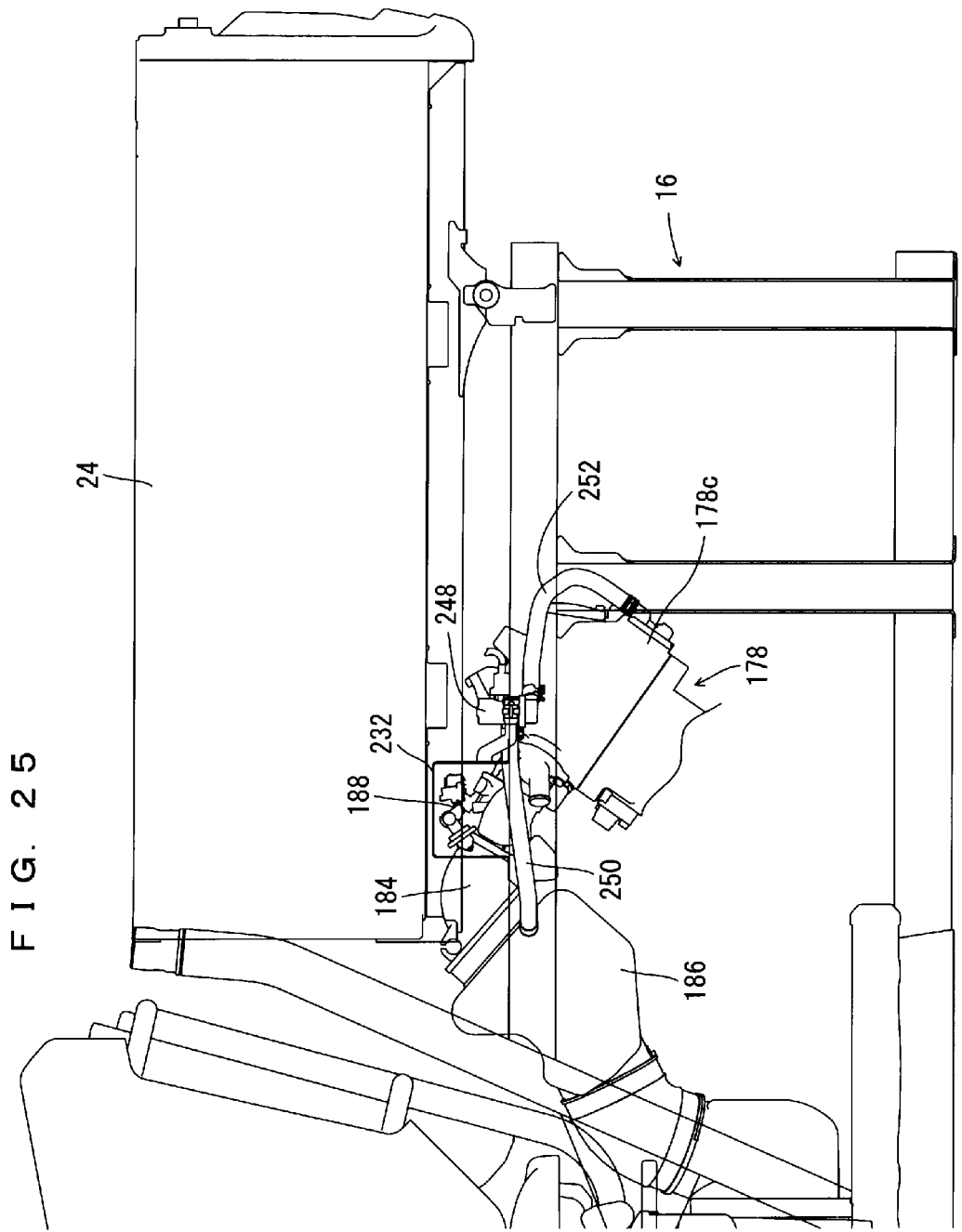
FIG. 25 is a side view showing the engine, the control valve and their surrounds.

Further, as shown in FIG. 24 and FIG. 25, a control valve 248 is disposed below the cargo bed 24 which is openable/closable with respect to the frame portion 16. The control valve 248 controls introduction and stoppage of secondary air into an intermadiate place of an exhaust path (exhaust part (not illustrated) inside the cylinder head 178c in the present preferred embodiment) of the engine 178.

The control valve 248 is disposed at a lower position than the highest portion of the cylinder head 178c. The control valve 248 is provided within a range defined by a dimension of the engine 178 in a fore-aft direction and a dimension of the engine 178 in the vehicle's width direction. Specifically, the control valve 248 has no portion protruding forward beyond the engine 178 in the fore-aft direction of the vehicle 10, and has no portion protruding rearward beyond the engine 178 in the fore-aft direction. Also, the control valve 248 has no portion protruding leftward beyond the engine 178 in the left-right direction of the vehicle 10, and has no portion protruding rightward beyond the engine 178 in the left-right direction. As described above, the control valve 248 is disposed near the engine 178. The control valve 248 and the air cleaner 186 are connected to each other with a hose 250, whereas the control valve 248 and the cylinder head 178c are connected to each other with a hose 252.

In the configuration described above, the secondary air is introduced from an air intake path (the air cleaner 186 in the present preferred embodiment) which is at an upstream position than the throttle valve (not illustrated) inside the throttle body 188, to the exhaust port via the hose 250, the control valve 248, the hose 252, and a one-way valve (lead valve: not illustrated) disposed inside the cylinder head 178*c*. The control valve 248 includes a solenoid (which is connected to an unillustrated control section) therein. The solenoid is opened/closed to control introduction and stoppage of the secondary air, based upon engine status information such as engine rotation speed and throttle opening degree. In normal operation mode, all of the components for introducing the secondary air, i.e., the control valve 248, the hoses 250, 252 and the one-way valve are covered by the cargo bed 24 from above.

Under the normal operation mode as described, the control valve 248 is protected by the cargo bed 24 since it is covered from above by the cargo bed 24. Also, it is easy to perform maintenance operations to the control valve 248 since the control valve 248 becomes accessible only by opening the cargo bed 24.

Also, the control valve 248 is disposed at a lower position than the highest portion of the cylinder head 178*c*, and therefore even in case where the cargo bed 24 is lowered while there is a tool or other object which is accidentally left behind, the load is first received by the cylinder head 178*c* which is stronger than the control valve 248, so it is possible to reduce damage to the control valve 248.

In the preferred embodiment described above, description was made for a case where the vehicle 10 preferably includes a pair of rear wheels 14. However, the vehicle may include two or more pairs of rear wheels.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
  a pair of front wheels;
  at least a pair of rear wheels;
  a frame portion supported by the pair of front wheels and the pair of rear wheels;
  a roll-over protection cage supported by the frame portion;
  a cargo bed supported by the frame portion pivotably behind the roll-over protection cage;
  an engine supported by the frame portion below the cargo bed;
  an output adjuster disposed below the cargo bed to adjust an output of the engine; and
  a protective member disposed between the cargo bed and the output adjuster; wherein
  the protective member overlaps at least a portion of the output adjuster but does not overlap at least a portion of the engine in a plan view.

2. The vehicle according to claim 1, wherein
  the cargo bed includes a bottom portion, and a reinforcing portion extending in a width direction of the vehicle on a lower surface of the bottom portion;
  the reinforcing portion includes a mounting portion attached to the bottom portion, and a protruding portion protruding downward from the mounting portion; and
  the protruding portion does not overlap either of the output adjuster and the protective member in a plan view.

3. The vehicle according to claim 1, wherein
  the engine includes a cylinder head; and
  the protective member does not overlap at least a portion of the cylinder head in a plan view.

4. The vehicle according to claim 1, wherein the protective member is supported by the frame portion.

5. The vehicle according to claim 1, wherein
  the frame portion includes a pair of side frame portions extending in a fore-aft direction below the cargo bed; and
  the protective member connects the pair of side frame portions to each other.

6. The vehicle according to claim 1, wherein the pair of side frame portions includes a pair of first supporting portions supporting a rear portion of the cargo bed pivotably, and a second supporting portion disposed at a more forward position than the pair of first supporting portions to support a forward portion of the cargo bed.

7. The vehicle according to claim 4, wherein the protective member is detachable from/attachable to the frame portion.

8. The vehicle according to claim 4, wherein
  the frame portion includes a pair of side frame portions extending in a fore-aft direction below the cargo bed; and
  the protective member includes an upper end located at a higher position than the pair of side frame portions.

9. The vehicle according to claim 1, wherein
  the output adjuster includes a throttle body; and
  the protective member is disposed between the cargo bed and the throttle body.

* * * * *